US009197369B2

United States Patent
Bergman et al.

(10) Patent No.: US 9,197,369 B2
(45) Date of Patent: Nov. 24, 2015

(54) HARQ-ACK FEEDBACK DETECTION FOR AN I/Q-MULTIPLEXED CONTROL CHANNEL

(75) Inventors: Johan Bergman, Stockholm (SE); Johan Hultell, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 322 days.

(21) Appl. No.: 13/335,563

(22) Filed: Dec. 22, 2011

(65) Prior Publication Data

US 2013/0064180 A1 Mar. 14, 2013

Related U.S. Application Data

(60) Provisional application No. 61/521,160, filed on Aug. 8, 2011.

(51) Int. Cl.
*H04W 24/00* (2009.01)
*H04L 1/00* (2006.01)
*H04L 1/16* (2006.01)
*H04L 5/00* (2006.01)
*H04L 1/18* (2006.01)

(52) U.S. Cl.
CPC ............ *H04L 1/0072* (2013.01); *H04L 1/1607* (2013.01); *H04L 1/1825* (2013.01); *H04L 1/1854* (2013.01); *H04L 5/0053* (2013.01); *H04W 24/00* (2013.01)

(58) Field of Classification Search
CPC ...... H04B 7/06; H04B 7/0404; H04B 7/0486; H04W 52/52; H04W 52/146; H04W 52/286
USPC .......................... 370/328, 338, 342, 335, 336
See application file for complete search history.

(56) References Cited

U.S. PATENT DOCUMENTS

| | | | |
|---|---|---|---|
| 2011/0116530 A1* | 5/2011 | Sambhwani | 375/145 |
| 2011/0170420 A1 | 7/2011 | Xi et al. | |
| 2012/0176947 A1* | 7/2012 | Xi et al. | 370/311 |

FOREIGN PATENT DOCUMENTS

| | | |
|---|---|---|
| EP | 1 760 924 A1 | 3/2007 |
| WO | WO 2009/120797 | 10/2009 |
| WO | WO 2010/078425 | 7/2010 |

(Continued)

OTHER PUBLICATIONS

LS R1-111995 (*R1-111995*, "*LS on the RAN1 agreements for 8C-HSDPA*", Barcelona, Spain, May 9-13, 2011).

(Continued)

*Primary Examiner* — Jae Y Lee
*Assistant Examiner* — Jean F Voltaire

(57) ABSTRACT

In a network that provides high-speed packet access, a mobile terminal is served by multiple activated serving cells which are grouped into cell groups. The mobile terminal monitors control channel transmissions to detect whether there are any transmissions for the mobile terminal from the activated serving cells for each cell group and provides feedback to a primary serving cell. When no transmission is detected from serving cells of a particular cell group, the mobile terminal may transmit feedback information explicitly indicating that no transmission is detected for that cell group. Alternatively, the mobile terminal may withhold transmitting feedback for that cell group and increases the power for transmitting the feedback information for cell groups in which transmissions were detected.

25 Claims, 14 Drawing Sheets

(56) References Cited

FOREIGN PATENT DOCUMENTS

WO     WO 2011/044170     4/2011
WO     WO 2011/100646     8/2011

OTHER PUBLICATIONS

Transmittal of International Search Report and Written Opinion mailed Feb. 15, 2013 in International Application No. PCT/SE2011/051580.

3GPP TSG-RAN WG1 #56bis, R1-091599, "HS-DPCCH Design DC-HSDPA and MIMO", Mar. 23-Mar. 27, 2009, Seoul, South Korea; section 2.

3GPP TSG RAN WG1 Meeting #65, R1-111995, "LS on the RAN1 Agreements for 8C-HSDPA", Barcelona, Spain, May 9-May 13, 2011; whole document.

K. Johansson et al., "Multi-Carrier HSPA Evolution," Vehicular Technology Conference, 2009. VTC Spring 2009. IEEE 69th, vol., No., pp. 1-5, Apr. 26-29, 2009 doi: 10.1109/VETECS.2009.5073693; whole document.

3GPP TSG RAN WG1 Meeting #66, R1-113421, "DTX Codeword for 8C-HSDPA", Zhuhai, P.R. China, Oct. 10-Oct. 14, 2011; whole document.

3GPP TSG RAN WG1 Meeting #66, R1-112723, "Minutes from RAN1 #66 HSPA Sessions", Athens, Greece, Aug. 22-26, 2011.

3GPP TSG RAN WG1 Meeting #66, "Open Issues Related to 8C-HSDPA", R1-112603, Athens, Greece, Aug. 22-Aug. 26 8011, section 5.3.2 "Agreements".

International Preliminary Report on Patentability dated Jul. 1, 2013 in International Application No. PCT/SE2011/051580.

Ericsson et al., "HS-DPCCH design for 4C-HSDPA," *3GPP TSG RAN WG1 Meeting* #60, R1-101293, Feb. 22-26, 2010, San Francisco, CA.

Supplementary European Search Report issued in European Patent Application No. 11870749.6 dated Aug. 6, 2014.

\* cited by examiner

HARQ-ACK FEEDBACK DETECTION FOR AN I/Q-MULTIPLEXED CONTROL CHANNEL

RELATED APPLICATION

This application claims the priority and benefit of U.S. provisional patent application 61/521,160 entitled "ENSURING HARQ-ACK DETECTION PERFORMANCE FOR I/Q MULTIPLEXED HS-DPCCH" filed Aug. 8, 2011, which is incorporated herein by reference in its entirety.

TECHNICAL FIELD

The technical field of the present disclosure generally relates to wireless communications networks for detection of automatic-repeat-request (ARQ) messages. Techniques to detect and decode hybrid automatic-repeat-request (HARQ) messages from a radio node in a high speed wireless network are presented.

BACKGROUND

The multi-carrier functionality for High-Speed Packet Access (HSPA) is evolving for each release of the 3GPP specifications, starting with the so-called Release 8 (Rel-8) specifications. For Release 9 (Rel-9), one of the introduced features was the combining of dual-carrier High-Speed Downlink Packet Access with Multiple-Input/Multiple-Output (MIMO) support (DC-HSDPA-MIMO), providing up to two MIMO-capable downlink carriers. Release 10 (Rel-10) HSPA evolved further by introducing support for up to four MIMO-capable carriers (4C-HSDPA). For Release 11 (Rel-11), 3GPP is standardizing support for up to eight MIMO-capable carriers (8C-HSDPA).

HSDPA systems use HARQ techniques to detect errors and facilitate retransmission of erroneously received data at the Medium Access Control (MAC) layer. This approach is quicker than relying on retransmissions at the Radio Link Control (RLC) layer. In HSDPA, HARQ operates at the transport block level, which means that errors are reported for individual transport blocks, and retransmission of an entire transport block is scheduled in response to a reported error. Only a single ACK/NACK bit is required for reporting the received status of each transport block.

To keep the delays associated with a retransmission low, the receiver (the user equipment, or UE, in the case of HSDPA) should report as quickly as possible whether a transport block was successfully received and decoded. HSDPA utilizes a stop-and-wait feedback process, to keep the signaling overhead low. With this approach, an ACK/NACK bit for each transport block is transmitted to the base station (the Node-B, in 3GPP terminology) at a pre-defined fixed time period (about five milliseconds) after the reception of the block. Retransmissions are scheduled in response to ACK/NACK bits that indicate a failed reception.

To allow for continuous data flow, HSDPA allows up to eight HARQ processes to run simultaneously. Each process is numbered and has its own buffer. The UE determines which HARQ process a given transport block belongs to from the downlink control signaling, and routes it to the appropriate buffer. With this approach, if a transport block is unsuccessfully received on one HARQ process, new data can continue to be sent on other HARQ processes even while decoding, ACK/NACK feedback signaling, and retransmission takes place for the first process.

The ACK/NACK feedback for HSDPA is transmitted by the UE on the High-Speed Dedicated Physical Control Channel (HS-DPCCH), which is an uplink channel specifically created to support HSDPA. This physical channel is transmitted on a separate channelization code using code-division multiplexing (CDM).

As specified in Rel-5 of the HSDPA specifications, the HS-DPCCH uses a spreading factor (SF) of 256, meaning that each data bit to be sent over the channel (a "channel bit") is "spread" (i.e., multiplied) by a 256-bit spreading sequence, i.e., 256 "chips" are transmitted for each bit. Since the transmitted chip rate is 3.84 million chips per second (Mcps) and the HS-DPCCH is organized into two-millisecond sub-frames, 30 channel bits are sent in each HS-DPCCH sub-frame.

In the case of conventional single-carrier, single-input single-output (SISO) HSDPA, the ACK/NACK bit for a single transport block is encoded to ten bits, for increased reliability, and transmitted in the first third (the first slot) of the HS-DPCCH sub-frame. The codebook mapping an ACK codeword and a NACK codeword to ten encoded bits is simple in this case, as an ACK is represented by a sequence of ten 1's while a NACK is represented by a sequence of ten 0's. Channel Quality Information (CQI) is transmitted in the remaining twenty bits of the HS-DPCCH sub-frame.

Rel-7 of the HSDPA specifications introduced support for MIMO transmissions. Specifically, a dual-stream transmit adaptive array (D-TxAA) approach was defined, supporting simultaneous transmission of two independent data streams to capable terminals under appropriate signal conditions. With HSDPA-MIMO, up to two transport blocks can be simultaneously transmitted to a UE in any given transmission time interval (TTI).

HARQ processing is handled separately for each of the two simultaneously transmitted transport blocks in HSDPA-MIMO. This means that twice as much HARQ feedback is transmitted for the dual-stream transmission, since one HARQ acknowledgement per stream must be transmitted back to the Node-B. Thus, two ACK/NACK messages are jointly coded to form ten channel bits, and transmitted in the same slot used for the single-stream ACK/NACK message. This results in a slightly more complicated codebook, as four possible combinations of ACK/NACK messages are mapped to the ten available channel bits.

Support for multi-carrier transmission in HSDPA further complicates the HARQ feedback process. Rel-8 of the 3GPP standard introduced support for dual-carrier (or "dual-cell") HSDPA transmissions. When dual-carrier support is coupled with MIMO techniques in Rel-9, up to two data streams can be transmitted on each carrier. This means that ACK/NACK feedback for as many as four transport blocks must be signaled to the base station, preferably using the same physical resources.

3GPP's solution to this was to encode all of this ACK/NACK feedback into the same ten channel bits used previously. The result is a significantly more complex codebook, including forty-eight codewords to account for all the possible combinations of ACK, NACK, and DTX (no transmission) states.

Support for four carrier (4C)-HSDPA transmission with MIMO was introduced in Rel-10 of the 3GPP standard. With up to two streams per carrier, a total of eight transport blocks could be received simultaneously in a sub-frame by a UE. As a result, the spreading factor was reduced by 3GPP from 256 to 128. This means that each bit is "spread" with a 128-bit long sequence. With the reduction in spreading factor, a total of 60 bits can be transmitted in a sub-frame. The HARQ-ACK information is transmitted in first third (the first slot) of the sub-frame, which carries a total of 20 bits.

To encode the HARQ-ACK message into a codeword transmitted on the HS-DPCCH, the activated carriers are divided into two groups. The first group consists of the HARQ-ACK information related to the primary serving high speed-downlink shared channel (HS-DSCH) carrier or "cell" and the $2^{nd}$ secondary serving HS-DSCH carrier or "cell". The second group consists of the HARQ-ACK information of the $1^{st}$ and $3^{rd}$ secondary serving HS-DSCH carriers or "cells".

Each of these groups is encoded based on the Rel-9 codebook as illustrated in FIG. 1 which shows a structure of the SF128 HS-DPCCH subframe used in Rel-10. In FIG. 1, the primary serving HS-DSCH cell (or simply "serving cell") is denoted c1. The $1^{st}$, $2^{nd}$ and $3^{rd}$ secondary serving cells are respectively denoted c2, c3 and c4. As seen, the HARQ-ACK information of the cells c1 and c3 (first group) are encoded jointly according to the Rel-9 codebook. Similarly the HARQ-ACK information of the cells c2 and c4 (second group) are also encoded jointly according to the Rel-9 codebook.

A "cell" in this context describes a combination of a signal carrier (or communications channel) and a geographical serving area of a base station, e.g., Node-B. Thus, a "cell" in this context is distinguished from a "sector" which is used to describe the serving area, i.e., multiple carriers covering the same area. An example site might include three sectors, each sector having N carriers, where N is the number of carriers deployed.

In order to avoid only half-slot transmission in the 1 slot carrying the HARQ-ACK information shown in FIG. 1, a new DTX codeword [0 0 1 1 0 1 1 0 1 0] was introduced in Rd-10. This DTX codeword is used when the UE does not detect any HS-DSCH transmissions for the cells constituting one of the first group c1/c3 or the second group c2/c4 and at the same time detects HS-DSCH transmissions for at least one cell belonging to the other of the first or the second group.

With the introduction of eight carrier (8C)-HSDPA, the problem of reliably encoding ACK/NACK feedback becomes even more challenging. Thus, a new acknowledgement and negative acknowledgement signaling solution is desirable to support the handling of retransmissions. To accommodate the additional downlink feedback, the following was agreed to at the 3GPP TSG-RAN WG1 meeting #65 (in Barcelona, Spain, $9^{th}$-$13^{th}$ May 2011). First, it was agreed to use an inphase (I)/quadrature phase (Q)-multiplexed SF128 HS-DPCCH solution in which HARQ-ACK information for up to four carriers is transmitted on the Q-branch of the used channelization code and the HARQ-ACK information for the remaining carriers is transmitted on the I-branch of the used channelization code. Second, it was agreed that the HARQ-ACK information transmitted on the I-branch and on the Q-branch are both encoded as done in Rel-10.

The agreements related to the HS-DPCCH HARQ-ACK coding for 8C-HSDPA are summarized in LS R1-111995 (R1-111995, "LS on the RAN1 agreements for 8C-HSDPA", Barcelona, Spain, $9^{th}$-$13^{th}$ May, 2011), which is incorporated by reference in its entirety. Those agreements specify: "Working assumptions that the Rel-9/10 HARQ-ACK codebooks are reused for HARQ-ACK transmissions is confirmed." That is, Rel-11 will reuse the existing Rel-9/10 HARQ-ACK codebooks.

An overview of the HS-DPCCH format used for Rel-11 is illustrated in FIGS. 2 and 3. FIG. 2 illustrates the spreading of HS-DPCCH when four or more secondary serving HS-DSCH cells are activated. FIG. 3 illustrates a structure of the HS-DPCCH sub-frame when four or more secondary serving HS-DSCH cells are activated. In this figure, the HARQ-ACK information related to the primary serving HS-DSCH cell and the $1^{st}$, $2^{nd}$, and $3^{rd}$ secondary serving HS-DSCH cells (denoted c1, c2, c3 and c4, respectively) is inserted into the first subframe time slot of one of the branches (the Q-branch in FIG. 3) of the HS-DPCCH and the HARQ-ACK information related to the $4^{th}$, $5^{th}$, $6^{th}$, and $7^{th}$ secondary serving cells (denoted c5, c6, c7 and c8, respectively) is inserted into the first subframe time slot of the other branch (the I-branch) of the HS-DPCCH.

SUMMARY

A non-limiting aspect of the disclosed subject matter is directed to a method to provide feedback from a consumer node, e.g., a UE, to provider node(s), e.g., a base station, Node B, etc. The method may be performed at or on behalf of the consumer node. The consumer node receives data substantially simultaneously transmitted on multiple cells by one or more provider nodes. The multiple cells may be grouped into multiple cell groups including first and second cell groups. Each cell is associated with one of the cell groups. The method also comprises determining, for each cell group including the first and second cell groups, whether there is data transmission on any cell associated with that cell group. The consumer node transmits first and second feedback information to at least one provider node when it is determined that there is data transmission received on at least one cell associated with the first cell group and no data transmission is received on any cells associated with the second cell group or when data transmission is received on at least one cell associated with the second group and no transmission is received on any of the cells associated with the first cell group. The first feedback information and second feedback information are associated respectively with the first and second cell groups. The multiple feedback information associated with the cell groups are transmitted on multiple feedback channels including first and second feedback channels. The multiple feedback channels have a one-to-one correspondence with the multiple cell groups such that the first feedback information and second feedback information are respectively transmitted on the first and second feedback channels.

In accordance with a non-limiting example embodiment, a mobile terminal monitors channel transmissions of a subframe from each of a plurality of activated serving cells serving the mobile terminal The activated serving cells are grouped into first and second cell groups in which the first cell group includes a primary serving cell, and one or more secondary serving cells and the second cell group includes one or more secondary serving cells different from the secondary serving cells of the first cell group. For each activated serving cell based on the monitoring, it is determined whether information for the mobile terminal is detected in the subframe of the channel transmission from that activated serving cell. For each of the first and second cell groups, it is further determined whether that cell group is a discontinuous transmission (DTX) cell group or a non-DTX cell group. A DTX cell group is a cell group in which no information is detected in the subframe of the channel transmission from any activated serving cell in that cell group and a non-DTX cell group being a cell group in which information is detected in the subframe of the channel transmission from at least one activated serving cell in that cell group. There is at least one activated serving cell in the DTX cell group and at least one activated serving cell in the non-DTX cell group. The mobile transmits, when one of the first and second cell groups is the DTX cell group and the other is the non-DTX cell group, first and second feedback information, respectively, on first and second feedback channels associated with the first and second cell groups to the primary serving cell. A DTX codeword is provided as the feedback information associated with the DTX cell group. The DTX codeword is a pattern of a predetermined number of bits indicating that no information for the mobile terminal was detected from any of the activated serving cells in the cell group.

In another non-limiting example embodiment, the mobile transmits, when one of the first and second cell groups is the DTX cell group and the other is the non-DTX cell group, one of first and second feedback information on corresponding one of first and second feedback channels associated with the non-DTX cell group to the primary serving cell, but withholds transmission of the other of the first and second feedback information on the other of the first and second feedback channels associated with the DTX cell group. The feedback information transmitted on the one feedback channel is transmitted with a boosted transmit power level, the boosted transmit power being greater than a power that would be used on one of the first and second feedback channels to transmit feedback information in a situation where the first feedback information and the second feedback information are transmitted on the first feedback channel and the second feedback channel, respectively.

An extension of the latter embodiment comprises a third cell group including one or more additional secondary serving cells. The third cell group is also a non-DTX group and is associated with a third feedback channel to the primary serving cell. Third feedback information is transmitted over the third feedback channel with a boosted power level greater than or equal to the required transmit power level.

For this latter embodiment, in a situation when the first and second cell groups both become non-DTX cell groups, the first feedback information may be transmitted on the first feedback channels with a first regular transmit power level and the second feedback information may be transmitted on the second feedback channels with a second regular transmit power level. In one example implementation, the boosted transmit power level is less than or equal to a sum of the first and second regular power levels.

In one non-limiting 3GPP-based example application, the first feedback information occupies a slot of a subframe of the first feedback channel and the second feedback information occupies a slot of a subframe of the second feedback channel. The plurality of activated serving cells includes a primary serving High Speed-Downlink Shared Channel (HS-DSCH) cell mapped to one of the first and second feedback channels and one of the secondary serving HS-DSCH cells whose HARQ-ACK information is mapped to the other of the first and second feedback channels. The channel transmissions are High Speed-Shared Control Channel (HS-SCCH) transmissions from the activated serving HS-DSCH cells. The first cell group is a quadrature (Q)-branch cell group comprising the primary serving HS-DSCH cell and three secondary serving HS-DSCH cells, and the second cell group is an inphase (I)-branch cell group comprising a remaining one or more of the secondary serving HS-DSCH cells. The determining of whether information for the mobile terminal is detected includes determining for each activated serving cell whether there is an HS-SCCH transmission detected that is directed to the mobile terminal from that activated serving cell. The first and second feedback channels are Q and I-branches, respectively, of an I/Q multiplexed High-Speed Dedicated Physical Control Channel (HS-DPCCH). The first feedback information and the second feedback information each include an HARQ-ACK codeword that indicates a transmission state for each activated serving cell of the corresponding cell group. The transmission state is one of an Acknowledgment (ACK) representing that transmission for the mobile terminal successfully decoded, a Negative Acknowledgment (NACK) representing that transmission for the mobile terminal is not successfully decoded, and a DTX representing that no transmission for the mobile terminal is detected.

Another example aspect of this non-limiting 3GPP-based example application is that the first feedback information and the second feedback information may each occupy 20-bits in a first slot of the subframe of the Q and I-branches of the I/Q multiplexed HS-DPCCH, respectively. A further example implementation repeats the HSPA Rel-10 DTX codeword to form the 20-bit DTX codeword.

Other non-limiting aspects of the disclosed subject matter are directed to a consumer node structured to provide feedback from a consumer node to provider node(s) in accordance with the one or more of the various methods described.

Other non-limiting aspects of the disclosed subject matter are directed to a non-transitory computer storage medium which stores instructions. When a computer executes the instructions, the computer executes a method to provide feedback from a consumer node to provider node(s) in accordance with the one or more of the various methods described.

DESCRIPTION OF THE DRAWINGS

The foregoing and other objects, features, and advantages of the disclosed subject matter will be apparent from the following more particular description of preferred embodiments as illustrated in the accompanying drawings in which reference characters refer to the same parts throughout the various views. The drawings are not necessarily to scale.

DETAILED DESCRIPTION

Figure 1:
FIG. 1 illustrates a SF128 HS-DPCCH subframe structure used in Rel-10.

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that flow charts represent various processes which may be substantially represented in computer readable medium and executed by a computer or processor, whether or not such computer or processor is explicitly shown.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "controller" should not be construed to refer exclusively to hardware capable of executing software, and may include, without limitation, digital signal processor (shortened to "DSP") hardware, read only memory (shortened to "ROM") for storing software, random access memory (shortened to RAM), and non-volatile storage.

In this document, a 3GPP-based example is used to facilitate description including 3GPP terminologies like HSPA, LTE, HSDPA, HS-DSCH, HS-DPCCH, CQI, etc. But this example used for explanation purposes should not be seen as limiting the scope of the disclosed subject matter to only the aforementioned 3GPP systems. Other wireless systems, such as Worldwide Interoperability for Microwave Access (WiMax), Ultra Mobile Broadband (UMB), Global System for Mobile Communication (GSM), and others may benefit from exploiting the ideas covered within this disclosure. Also, a Node-B radio base station (e.g., RBS, eNodeB, eNB, etc.) is used as an example of a network provider node. Also without loss of generality, a user equipment (UE) is used as an example of a consumer node or terminal that communicates wirelessly with the provider node.

The inventors recognized a need to improve the performance of HARQ-ACK detection over an I/Q-multiplexed control channel (like the example HS-DPCCH) for multiple carrier-based transmissions.

Following the example, non-limiting 3GPP context established in the background, the reception of the HARQ-ACK information transmitted on the HS-DPCCH physical channel generally includes two steps: (1) Detecting HARQ-ACK transmissions; and (2) Decoding the received HARQ-ACK information. For the detecting step (1), the HARQ-ACK information transmitted on the HS-DPCCH in a certain subframe depends on the HS-DSCH transmissions that occur on the downlink. More specifically, if the UE does not detect any High-Speed Shared Control Channel (HS-SCCH) transmissions on the downlink, it does not (up until Rel-10) transmit any HARQ-ACK information on the HS-DPCCH. This can occur if no data transmission occurs on the serving and secondary serving HS-DSCH cells or can occur if there is data transmission on one or more downlink cells but the UE fails to detect the associated HS-SCCH transmission(s).

In order to distinguish between the events where there is and where there is no HARQ-ACK transmissions (in this case only noise will be received), respectively, a detector at the Node-B is used. This detector compares the signal energy (or power) of the HARQ-ACK transmissions with a detection threshold. The value of the detection threshold depends on: an acceptable false alarm probability, which is defined as the probability that the Node-B "detects" a HARQ-ACK transmission even though the UE did not transmit any, and a number of possible codewords, which in turn depends on the number of activated downlink carriers.

As a result, the UE preferably transmits the HARQ-ACK information with a minimum HS-DPCCH HARQ-ACK gain factor (power offset, e.g., relative to the power level of the uplink DPCCH channel), referred to herein for convenience to aid in description as $\beta_{hs,detection}$. For a given detection threshold used at the Node-B, a certain gain factor needs to be used at the UE transmitter when the UE transmits the HS-DPCCH for there to be sufficient signal energy at the Node-B for assured detection.

For the decoding step (2), when the Node-B detects the presence of an HARQ-ACK transmission, it decodes the HARQ-ACK information received in the HARQ-ACK field (the first slot of the HS-DPCCH sub-frame). When performing this operation, the Node-B compares the de-spread HARQ-ACK information with a set of potential codewords and selects one of them based on some criteria (e.g., minimum norm).

In order to achieve a certain decoding performance, the HS-DPCCH signal energy received at the Node-B should be at or above certain threshold—a decoding threshold—to ensure that the HARQ-ACK information from the UE can be decoded reliably. As a result, the UE preferably transmits the HARQ-ACK information with a minimum HS-DPCCH HARQ-ACK gain factor (power offset, e.g., relative to the power level of the uplink DPCCH channel), referred to herein for convenience as $\beta_{hs,decoding}$. This gain factor used at the UE ensures there is sufficient energy to meet the decoding threshold at the Node-B. The gain factor $\beta_{hs}$ used by the UE may be signaled for example by a radio network controller RNC via radio resource control RRC signaling, and $\beta_{hs}$ may be chosen in such a way so that $\beta_{hs} \geq \beta_{hs,detection}$ and $\beta_{hs} \geq \beta_{hs,decoding}$. Again, the terms are used herein for convenience to describe that a certain HS-DPCCH needs to be used to achieve a sufficient detection and decoding performance.

Thus, it is desirable for the UE to transmit the HARQ-ACK information with a sufficient HS-DPCCH HARQ-ACK gain factor so that the HS-DPCCH signal energy received at the Node-B is at or above the decoding threshold, which in turn allows the information to be decoded reliably. The HS-DPCCH is a non-limiting example of a channel that the UE uses to send HARQ-ACK feedback information to the provider Node B. If the UE, for each of the in phase (I) and quadrature (Q) branches of the HS-DPCCH (i.e., HS-DPCCH1 and HS-DPCCH2), reuses the Rel-10 procedures described in the background, this results in problems related to the detection of HARQ-ACK transmissions as explained below. For sake of simplicity, the following are assumed. The UE has four or more secondary serving HS-DSCH cells configured, and there are active carriers so that the HARQ-ACK feedback information of at least one active carrier is mapped on each feedback channel; and the HARQ-ACK information associated with the primary and the $1^{st}$, $2^{nd}$ and $3^{rd}$ secondary serving HS-DSCH cells (respectively denoted c1, c2, c3, and c4) are grouped together and transmitted on the Q-branch, and the HARQ-ACK information associated with the $4^{th}$, $5^{th}$, $6^{th}$ and $7^{th}$ secondary serving HS-DSCH cells (respectively denoted c5, c6, c7, and c8) are grouped together and transmitted on the I-branch.

Figure 4:
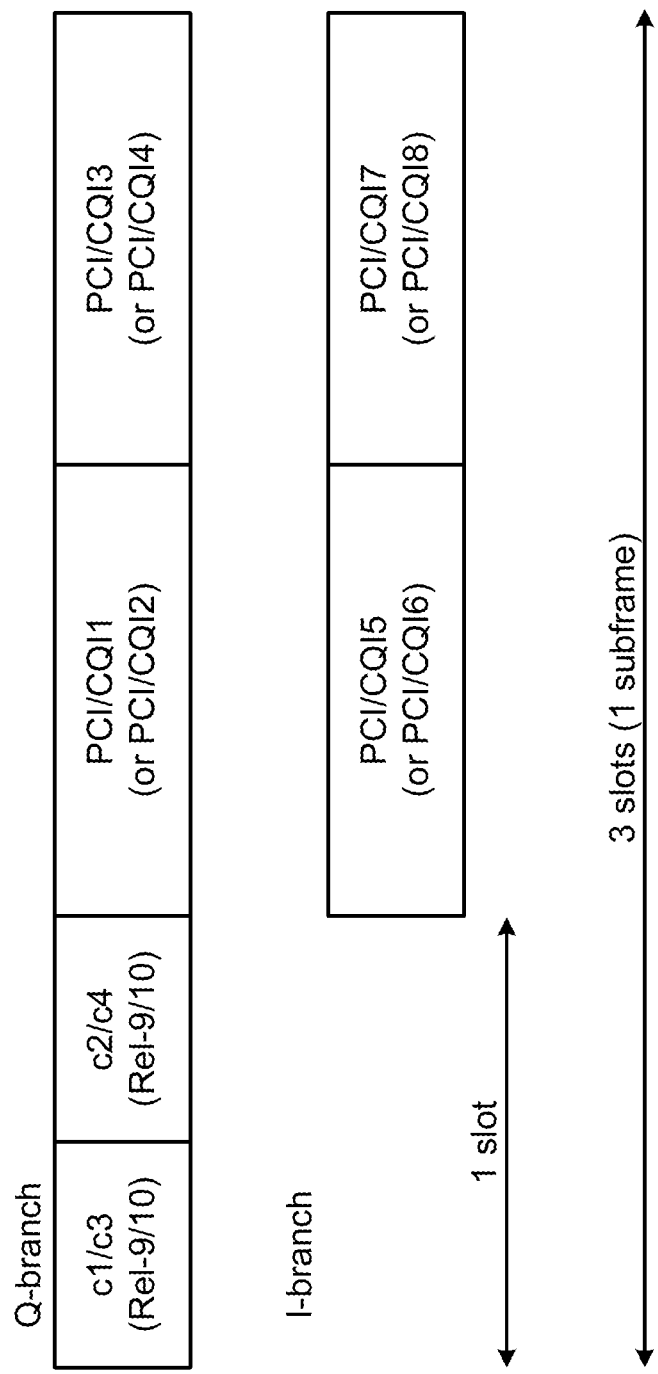
FIG. 4 illustrates a HS-DPCCH transmission when the consumer node does not detect any HS-SCCH related to the $4^{th}$, $5^{th}$, $6^{th}$, or $7^{th}$ secondary serving HS-DSCH cells in the case where the UE is not mandated to transmit any information in the HARQ-ACK field corresponding to the $4^{th}$, $5^{th}$, $6^{th}$, or $7^{th}$ secondary serving HS-DSCH cells.

If 3GPP Rel-10 principles are used independently for the HARQ-ACK encoding associated with each group of the downlink carriers (i.e., the I-branch cell group and Q branch cell group transmitted on the I and Q-branches, respectively) and the network only schedules transmissions on cells c1, c2, c3 and c4, or if transmissions occur but the UE does not detect such transmissions over any of the corresponding HS-SCCHs, then the UE does not transmit, i.e., it DTX's, its HARQ-ACK transmissions related to cells c5, c6, c7, and c8. That is, no HARQ-ACK transmission occurs on the I-branch. This situation is illustrated in FIG. 4.

For ease of reference, cells c1, c2, c3, and c4 will be referred to as the Q-branch transmission cell group (or simply "cell group") and cells c5, c6, c7, and c8 will be referred to as the I-branch cell group. In FIG. 4, it is assumed that the UE detects HS-SCCH transmission from the provider node related to at least one of the cells in the Q-branch cell group, but does not detect any provider node HS-SCCH transmission related to the cells in the I-branch cell group. According to Rel-10, the entirety of the first slot of the I-branch subframe, which normally carries the HARQ-ACK information of the I-branch cell group—is DTXed, i.e., no HARQ-ACK transmission occurs on the I-branch. However, if the UE does not transmit anything on this first slot of the I-branch, less energy is available, e.g., 3 dB less, for detecting the HARQ-ACK transmissions at the Node-B as compared to the case where HARQ-ACK transmission occurs on both the I-branch and the Q-branch.

As a result, the Node-B must detect HARQ-ACK transmissions (as described above) independently for each I/Q branch, or alternatively, use a detection technique that depends on the specific downlink carrier scheduled for transmission. If transmissions only occur on carriers 1 to 4, then a lower HARQ-ACK transmission detection threshold may be used by the Node B than what could be used if the Node-B schedules data transmissions on at least 5 carriers, given that the false alarm probability is preferably equal in the two cases. This is because the HARQ-ACK transmission detection threshold used to distinguish between noise and true HARQ-ACK receptions should be chosen so that sufficient quality can be maintained when the Node-B schedules HS-DSCH transmissions on cells of only one of the two cell groups. As the Node-B only can use half of the potentially available HARQ-ACK energy, this means that the UE would need to use a higher gain factor $\beta_{hs}$ to meet a false alarm probability requirement.

The terms $\beta_{hs,detection}$ and $\beta_{hs,decoding}$ are theoretical values describing the gain factors at the UE for meeting detection performance and decoding performance, respectively. $\beta_{hs}$ on the other hand is an actual gain factor is used in practice for the HS-DPCCH, which is preferably set so that both the decoding and detection performance can be achieved at the Node-B.

Thus, when an entire slot is DTXed, i.e., nothing is transmitted, such as during the first slot of the I-branch as shown in FIG. 4, less power is available to detect the HARQ-ACK transmissions, which is undesirable. To accommodate this situation, $\beta_{hs}$ can be increased, but this is disadvantageous in terms of power consumption at the UE because it would increase power consumption and interference when in case the UE transmits HARQ-ACK feedback on both HS-DPCCH1 and HS-DPCCH2. Alternatively, the thresholds the Node-B uses for detecting the HS-DPCCH can be decreased. But this is disadvantageous in terms of detection/decoding performance at the Node-B if a joint detector based on both the Q and I-branches of the HS-DPCCH is used since this would increase the false alarm probability.

Figure 5:
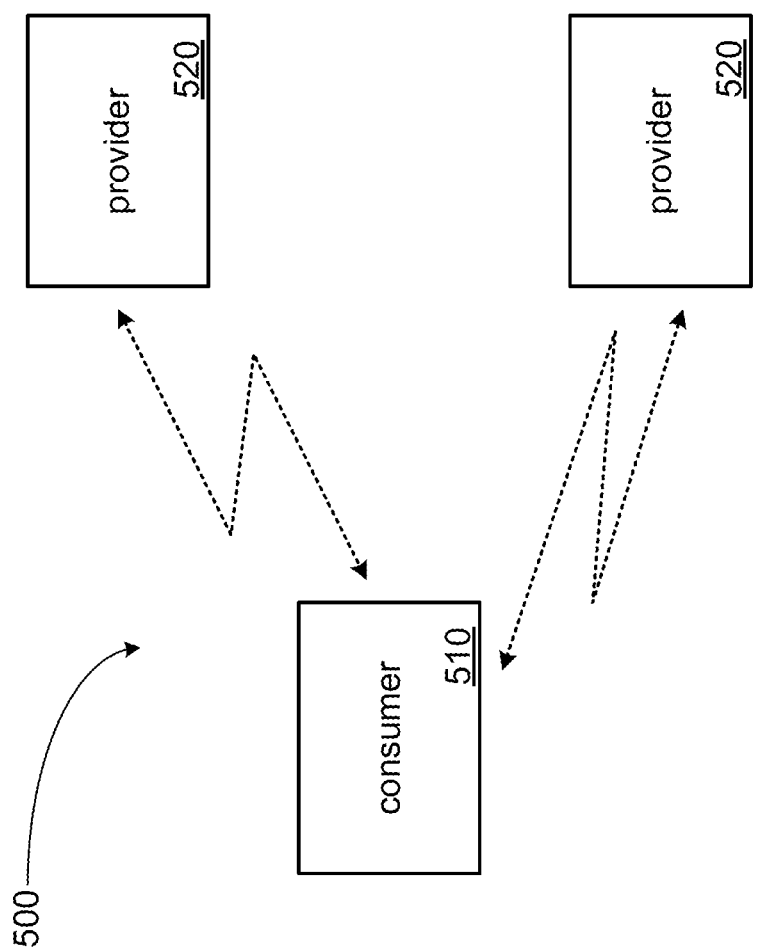
FIG. 5 illustrates an example scenario in which a consumer node is in communication with multiple provider nodes.

One or more non-limiting aspects of the disclosed subject matter address some or all of the issues described above. One aspect involves a consumer node of a wireless system structurally arranged to receive data wirelessly transmitted on multiple (two or more) cells simultaneously from one or more other provider nodes of the wireless system. Data can be user data (user plane information) and/or control data (control plane information). As a matter of convenience, the node that receives the data transmission is referred to as a consumer node, e.g., a UE, and each node that transmits the data to the consumer node is referred to as a provider node, e.g., a base station/Node-B. Thus, the consumer node receives data (user and/or control) wirelessly transmitted on multiple cells simultaneously from one or more provider nodes of the wireless system. FIG. 5 illustrates an example of a wireless system 500 in which two provider nodes 520 are transmitting data to a single consumer node 510. This is merely an example, and it should be understood that in reality, there can be many provider and consumer nodes.

Note that the designation of a node being a consumer node 510 or a provider node 520 is not fixed to the node itself. For example, a UE can be a consumer node when receiving data on HS-DSCH on the downlink (DL), and can be a provider node when sending data on the enhanced dedicated channel (E-DCH) on the uplink (UL). Similarly, the Node-B can be a provider node on the DL and a consumer on the UL. It should be noted that the disclosed subject matter is not limited to UEs and Node-Bs. The UE is merely an example of a wireless terminal, and the Node-B is an example of a network node.

Figure 2:
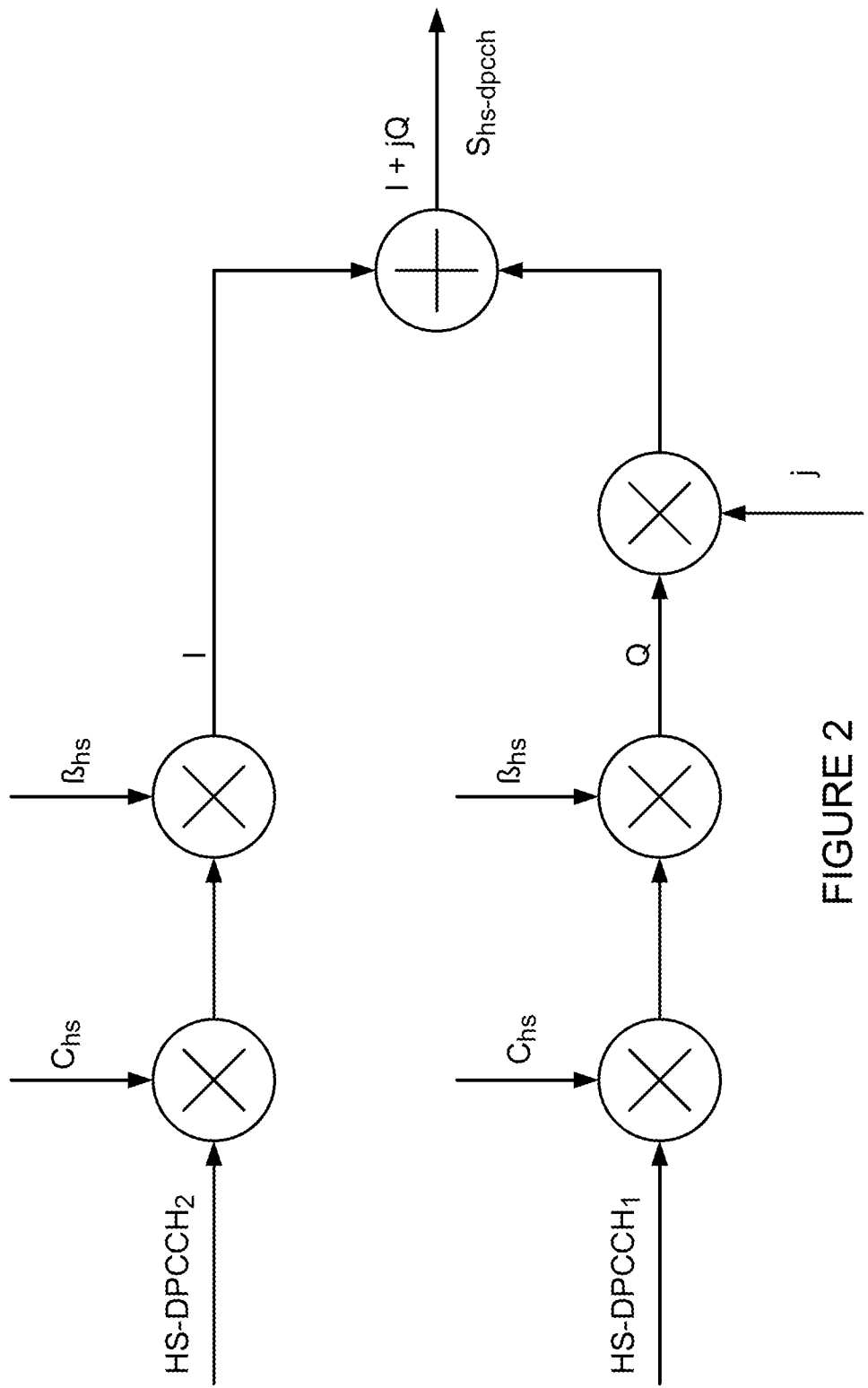
FIG. 2 illustrates of spreading of HS-DPCCH when four or more secondary serving HS-DSCH cells are configured and there is at least one carrier whose HARQ-ACK information is mapped to each of the feedback channels that is activated.

The multiple cells include at least one cell designated as the primary cell and a predetermined number of secondary cells. Communicating on a cell means the consumer and provider nodes operate on one carrier in a specific sector. Each provider and consumer node can transmit and receive data transmitted in multiple cells simultaneously. A cell is thus a combination of a carrier and a base station serving a particular sector on a particular frequency. Referring back to FIGS. 2 and 3, the primary HS-DSCH cell c1 and the secondary HS-DSCH cells c2-c8 are non-limiting examples of cells. All cells—the primary and the secondary cells—are each grouped into one of multiple (two or more) cell groups. Again referring back to FIGS. 2 and 3, the Q- and I-branch cell groups are non-limiting examples of cell groups.

Figure 3:
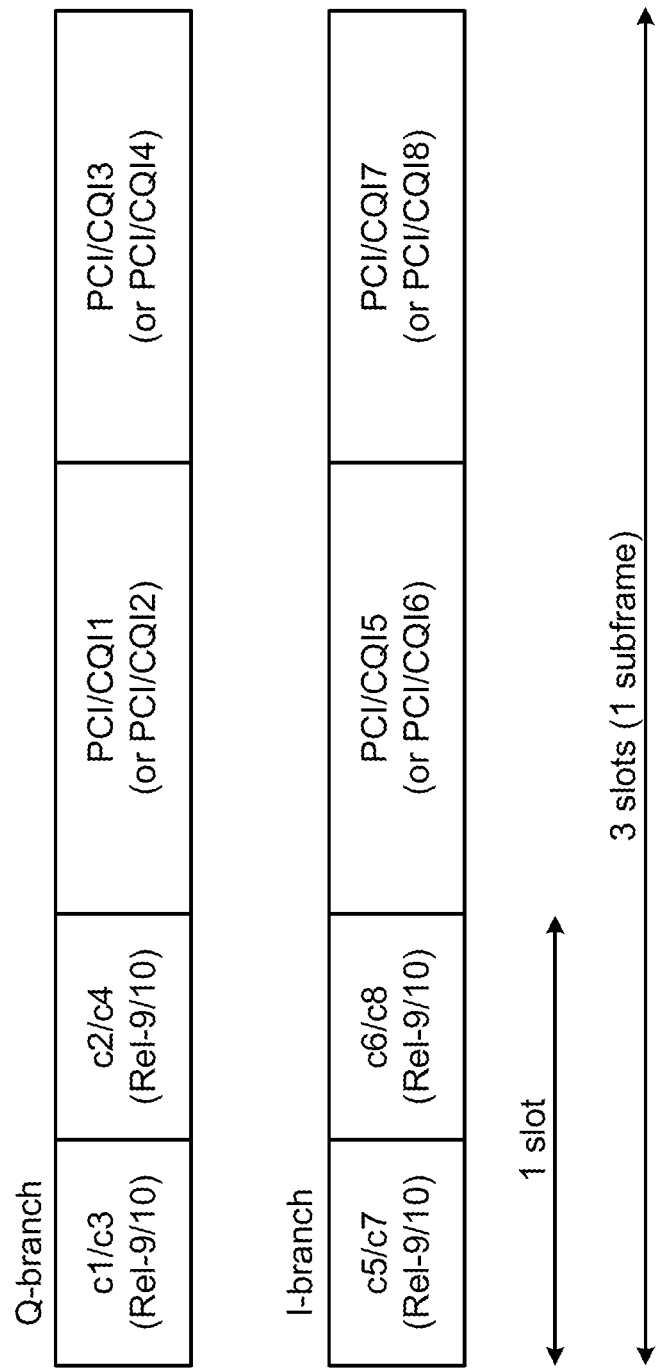
FIG. 3 illustrates a HS-DPCCH subframe structure when four or more secondary serving HS-DSCH cells are configured and there is at least one carrier whose HARQ-ACK information is mapped to each of the feedback channels that is activated.

For each consumer node 510, each cell is associated with one of the cell groups. In FIG. 3, cells c1, c2, c3 and c4 (primary cell and first through third secondary cells) belong to the Q-branch cell group and cells c5, c6, c7 and c8 (fourth through seventh secondary cells) belong to the I-branch cell group. Also, each cell may belong to one of the cell groups such that each cell group has no cell in common with any other cell group from the perspective of the consumer node 510. Again in FIG. 3, it is seen that the Q and I-branch cells groups have no cell in common with each other. Note that the provider node 520 can also be transmitting data to the consumer node 510 on a different carrier. That is, the provider node 520 as well as the consumer node 510 can be associated with one or more cells.

In a non-limiting aspect of the disclosed subject matter, the consumer node 510 is structurally arranged to transmit feedback information to at least one of the one or more provider nodes 520 on multiple (e.g., two or more) feedback channels, where feedback information associated with the cell groups are carried on feedback channels. Preferably, there is a one-to-one correspondence between the cell groups and the feedback channels such that each feedback channel carries the feedback information associated a particular cell group. Also preferably, the feedback channels are physical radio channels. The feedback channels can be dedicated for the purpose of feedback or can be shared channels. Each feedback channel is monitored by at least one of the provider nodes 520.

The consumer node 510 may indicate an A/N/D state of data transmitted by the provider node 520 on each of the multiple cells as an example of the feedback information. The "A" (or ACK) state indicates that the data transmitted on the cell is successfully received and decoded; "N" (or NACK) state indicates that the data transmitted on the cell is not successfully received or decoded; and "D" (or DTX) state indicates that no data transmission is detected on that cell. For each feedback channel, the consumer node 510 can encode the detected data transmission states A/N/D of the cells of the corresponding cell group into a predetermined number of bits, and transmit the encoded A/N/D bits on that feedback channel.

In one circumstance, the consumer node 510 may detect that in a cell group, no data is received on any cell in that group, and therefore, the D or DTX state applies to all cells in the group. This can happen when the provider node 520 does not transmit data to the consumer node 510 on the cells in that group. This can also happen when the consumer node 510 fails to detect the data transmission even though the data was actually transmitted to the consumer node 510 of interest, e.g., the consumer node 510 does not detect data transmission on any cell within that cell group.

Again for ease of reference, the term "DTX cell group" is used in this document to refer to a cell group in which the consumer node 510 does not detect data transmission on any cell in that group. Conversely, the term "non-DTX cell group" is used to refer to a cell group in which the consumer node 510 does detect data transmission on at least one cell in that group.

One aspect of the disclosed subject matter addresses a circumstance in which the consumer node 510 detects at least one DTX cell group and at least one non-DTX cell group. When this occurs, for each DTX cell group, the consumer node 510 can explicitly transmit state information—DTX state—as the feedback information on the feedback channel mapped to that DTX cell group. The DTX state information represents that the data transmission state is "D" (no transmission) for all cells in that DTX cell group.

For each non-DTX cell group, the consumer node 510 can transmit the detected data transmission states A/N/D of that non-DTX cell group on the feedback channel mapped to that non-DTX cell group. Each of the DTX and non-DTX groups are transmitted on separate feedback channels (e.g., HS-DPCCH1 and HS-DPCCH2) in the first slot of the subframe.

In one non-limiting example embodiment, both the DTX state information (for the DTX cell group) and the data transmission state information (for the non-DTX cell group) are encoded as codewords. For example, the codewords may be chosen from a plurality of predetermined codewords provided in a codebook. Preferably, each codeword including the DTX codeword is of sufficient length (e.g., in number of bits) to fill a state information slot in the feedback channel reserved to carry the data transmission state information.

Preferably, the plurality codewords are determined so as to minimize or at least reduce the probability of an error event, which in this context is viewed as the probability of the DTX codeword being erroneously interpreted as another codeword or vice versa.

Another aspect of the subject matter also addresses the circumstance in which the consumer node 510 detects at least one DTX cell group and at least one non-DTX cell group. When this occurs, for each DTX cell group, the state information slot in the feedback channel mapped to that DTX cell group is DTXed. In other words, no feedback information is transmitted on the state information slot on that feedback channel.

Instead, the power not used by DTXing the feedback channels mapped to the DTX cell groups is used to boost the transmission power on the feedback channels mapped to the non-DTX cell groups. In this way, more energy is available to enhance detection and decoding performance at the listening provider node(s) 520 without increasing the transmit power level requirement at the consumer node 510. The amount of boosting power may be varied. As one example, the amount of DTXed power can be evenly divided among the remaining feedback channels.

In addition, these two aspects may be combined when both DTX and non-DTX cells groups are detected.

In this disclosure, the UE is an example of a consumer node 510 that receives data simultaneously transmitted on the cells of multiple cell groups, and the Node-B (base station) is an example of a provider node 520 that receives the feedback information transmitted from the UE. As another example, the Node-B could be the consumer node and the UE the provider node.

Also, HS-DSCH cells are used as examples of transmission cells, and the HS-DPCCH is used as an example of a feedback channel. Again, these are merely examples and are not intended to be limiting. The data transmitted from the provider node(s) 520 (e.g., Node-Bs) to the consumer node 510 (e.g., UE) can be user and/or control data.

In a specific non-limiting example, a UE is configured to receive data transmitted on with four or more secondary serving HS-DSCH cells and configured to transmit HARQ-ACK information (e.g., feedback information) on two I/Q multiplexed HS-DPCCH channels as feedback channels. The primary serving HS-DSCH cell and the multiple (at least four in this instance) secondary serving HS-DSCH cells are grouped into two cell groups, and the I and Q-branch channels map to a corresponding one of the two groups.

Without loss of generality, one or more aspects of the subject matter are described in detail for explanation purposes and are not intended to be limiting. In one non-limiting example, the UE transmits a DTX codeword comprising a number of encoded bits, e.g., 20, on one of the HS-DPCCH channels instead of DTX'ing (i.e., instead of not transmitting anything) this HS-DPCCH channel when the UE decodes HS-DSCH transmission(s) from one or more downlink cells and none of these decoded HS-DSCH transmission(s) corresponds to the HARQ-ACK fields mapped to this HS-DPCCH channel.

As one example, an I/Q-multiplexed HS-DPCCH structure is considered where the HARQ-ACK information for one or more downlink cells are transmitted by the UE (consumer node 510) on the I-branch of a channelization code $c_j$, and received by the Node-B (provider node 520). These carriers are said to belong to group 1 (G1). The HARQ-ACK information related the other downlink cells are in a similar manner transmitted on the Q-branch of the same channelization code $c_j$. These carriers are said to belong to group 2 (G2). For the described situation, a non-limiting example method—illustrated in the flow chart of FIG. 6—is proposed in which the UE performs the following steps in each subframe for the serving HS-DSCH cell (primary cell) and each of the activated secondary serving HS-DSCH cell.

The UE monitors the HS-SCCH set for each downlink cell to determine whether there is any data transmission to that UE in that subframe (S610). The UE classifies the serving HS-DSCH cell and the activated secondary serving HS-DSCH cells based on whether a HS-SCCH transmission was detected for each of those cells (S620). A decision is made in S630 whether an HS-SCCH transmission was detected in at least one of the cells in group G1 and in at least one of the cells in group G2. If so, both G1 and G2 are non-DTX cell groups, and the UE encodes the HARQ-ACK information related to each group G1 and G2 of activated cells based on the Rel-10 HARQ-ACK codebook (i.e., use the codewords specified in Rel-10) (S640). If not, a decision is made in S650 whether both G1 and G2 are DTX cell groups. If yes, then no HARQ-ACK information is transmitted in the sub-frame, which is also in line with Rel-10 (S660). If not, then one of G1 and G2 is a DTX cell group and the other is a non-DTX cell group, and the UE encodes the HARQ-ACK information related to the non-DTX cell group on the I/Q branch associated with the non-DTX cell group, e.g., according to the Rel-10 HARQ-ACK codebook (S670). The UE then transmits a specific codeword—the DTX codeword—in the HARQ-ACK field on the I/Q branch associated with the DTX cell group (S680). For example, the DTX codeword introduced in Rel-10 may be transmitted both for the $4^{th}$ and $5^{th}$ secondary serving HS-DSCH cells and the $6^{th}$ and $7^{th}$ secondary serving HS-DSCH cells.

Preferably, the DTX codeword transmitted is sufficiently long, e.g., 20 bits, so that it is transmitted during the entire slot. In Rel-11, the DTX codeword may be transmitted in the first slot of the HS-DPCCH subframe.

The DTX codeword can be represented by any codeword that is not already used for some other purpose in the codebook. However, to minimize or at least reduce the probability of error events (e.g., the probability of the DTX codeword being erroneously interpreted as another codeword or vice versa), the DTX codeword is preferably designed in such a way so that a large Hamming distance with respect to other codewords is maintained. The larger the Hamming distance between the DTX codeword and the other codewords in the HARQ-ACK codebook, the better decoding performance.

One non-limiting example approach to obtain a 20-bit DTX codeword with the desired properties with respect to the Hamming distance is to repeat the 10-bit DTX codeword introduced in Rd-10. Because the DTX codeword introduced in Rd-10 was designed to maintain a large Hamming distance with respect to the HARQ-ACK codewords in Rd-10 (for each half slot carrying 10 bits), the repeated DTX codeword will also experience a large Hamming distance with respect to a "composite HARQ-ACK codeword" composed of the HARQ-ACK codewords for the first and second half-slot. Thus, in an example embodiment, the Rd-10 DTX codeword is repeated when a UE is configured with at least four activated secondary serving HS-DSCH cells, the UE does not detect any HS-SCCH transmissions for the downlink cells in one of the cell groups, and at the same time, the UE detects HS-SCCH transmissions for at least one cell in the other group. The DTX codeword is given as:

$$DTX_{Rel-11} = [DTX_{Rel-10} DTX_{Rel-10}]$$

where $DTX_{Rel-10} = [0\ 0\ 1\ 1\ 0\ 1\ 1\ 0\ 1\ 0]$. This may be specified in 3GPP 25.212 specifications (sub-clause 4.7.3B.1) by modifying the paragraph When Secondary_Cell_Active is 2 or 3, and when DTX message is indicated for the cells, whose HARQ-ACK information is jointly encoded, the specific DTX codeword as defined in Table 15C.2A is transmitted except for the case when DTX message is indicated for all active cells, in which case the HARQ-ACK slot is DTXed.

so that it also covers the case where Secondary_Cell_Active is greater than 3 and the HS-DPCCH is I/Q-multiplexed. One example of such a modification is:

When Secondary_Cell_Active is greater than 2, and when DTX message is indicated for a cell pair, whose HARQ-ACK information is jointly encoded, the specific DTX codeword as defined in Table 15C.2A is transmitted for that cell pair except for the case when DTX message is indicated for all active cells, in which case the HARQ-ACK slot is DTXed.

Figure 7:
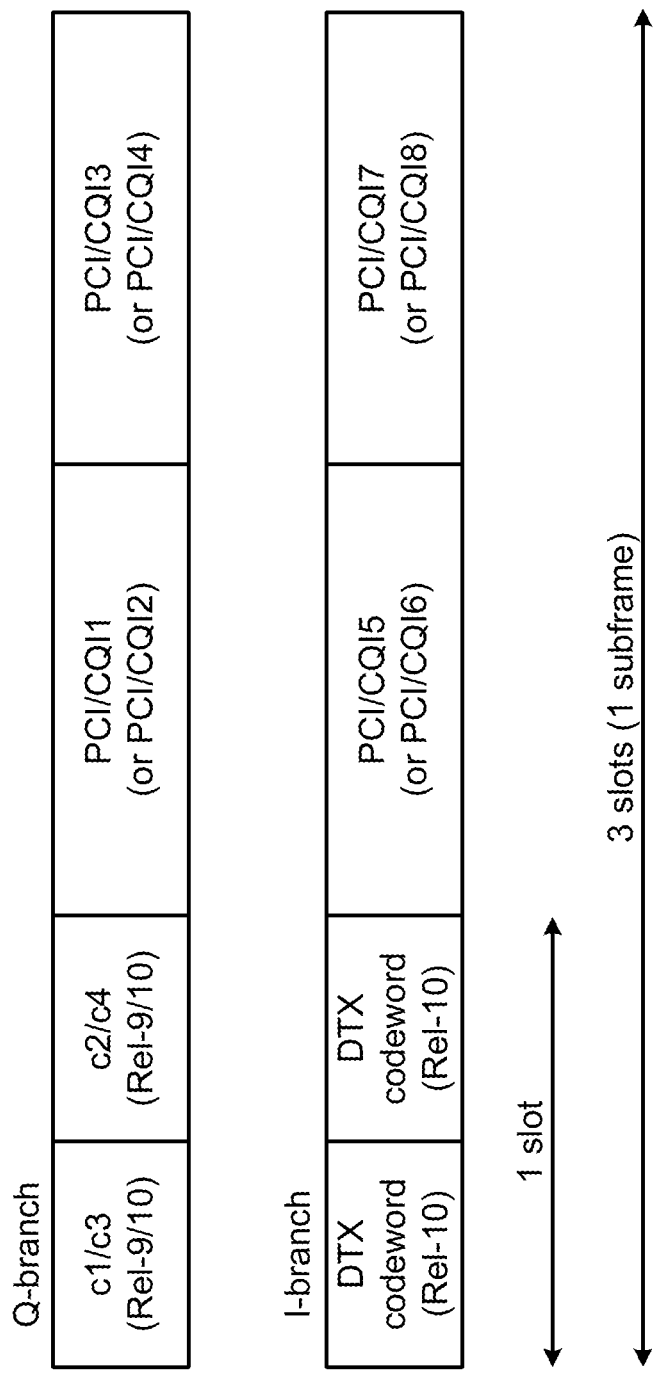
FIG. 7 illustrates an example HS-DPCCH subframe structure for transmission by the consumer node associated with the first embodiment.

An example of this non-limiting approach is illustrated in FIG. 7 which shows an example HS-DPCCH subframe structure when the UE does not detect any HS-SCCH transmissions related to the $4^{th}$, $5^{th}$, $6^{th}$, and $7^{th}$ secondary serving HS-DSCH cells. In FIG. 7, the Q-branch cell group (with cells c1, c2, c3, and c4) is the non-DTX cell group, and the I-branch cell group (with cells c5, c6, c7, and c8) is the DTX cell group. As seen, the two repetitions of the Rd-10 DTX codewords are transmitted in the first slot of the I-branch feedback channel (HS-DPCCH2). As a result of the HARQ-ACK transmission occurring on both the I- and the Q-branches, more signal energy is available at the Node-B for HARQ-ACK transmission detection and decoding. Thus, the gain factor $\beta_{hs}$ at the UE need not be increased and the thresholds at the Node-B need not be decreased.

Figure 8:
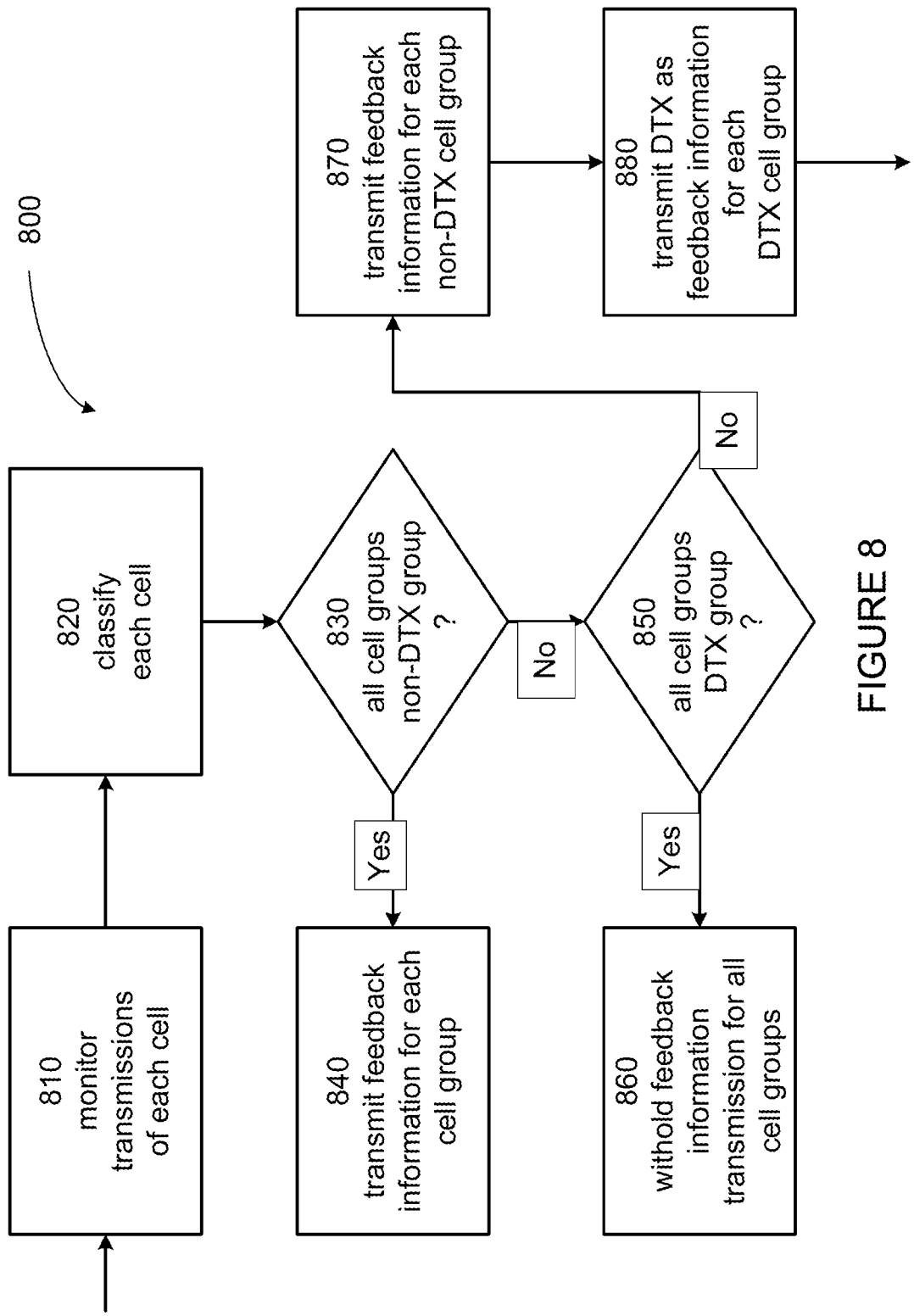
FIG. 8 is a flow chart illustrating a second non-limiting example embodiment for transmitting feedback information on feedback channels from a consumer node to a provider node.

FIG. 8 is a flow chart illustrating a second non-limiting example embodiment for transmitting feedback information on feedback channels from a consumer node to a provider node. The second non-limiting example embodiment is a more generalized version of the first embodiment. The UE monitors transmissions for each downlink cell to determine whether there is any data transmission to that UE (S810). Based on the determinations made in S810, the UE classifies each of the cells (S820). A decision is made in S830 whether all of the cell groups are non-DTX cell groups. If so, the UE transmits the HARQ-ACK information related to each cell group of activated cells (S840). If not, a decision is made in S850 whether both G1 and G2 are DTX cell groups. If yes, then no HARQ-ACK information is transmitted for all cell groups (S860). If not, then at least one cell group is a DTX cell group and at least one other cell group is a non-DTX cell group. The UE transmits the HARQ-ACK information for each non-DTX cell group (S870). The UE transmits a DTX signal containing the DTX codeword as feedback information for each DTX cell group (S880). Since the UE transmits a signal on all HS-DPCCH feedback channels, more signal energy is available at the Node-B for HARQ-ACK transmission detection as compared to the case for which no downlink transmissions are detected for the HS-DPCCH channel associated with the downlink cells.

Figure 9:
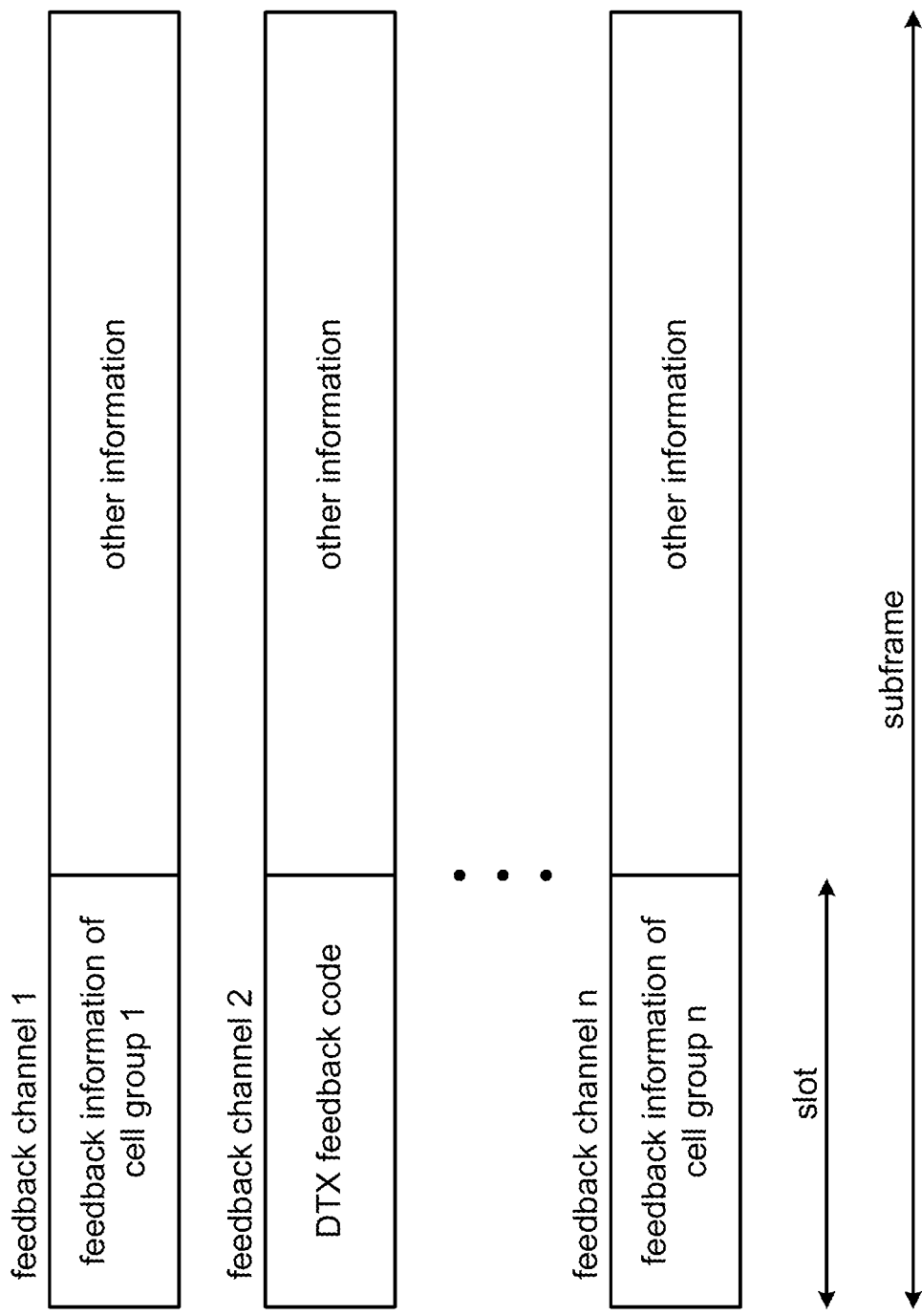
FIG. 9 illustrates an example feedback channel subframe structure for transmission by the consumer node for the second embodiment.

FIG. 9 illustrates an example feedback channel subframe structure for transmission by the consumer node for the second embodiment. Each cell group has its associated feedback channel 1, 2, . . . , n. For feedback channels 1 and n in this example, the UE transmits the HARQ-ACK information for each non-DTX cell group. For feedback channel 2 in this example, the UE transmits a DTX feedback code as would be the case for other DTX cell groups. As explained above, more signal energy is available at the Node-B for HARQ-ACK transmission detection.

Figure 6:
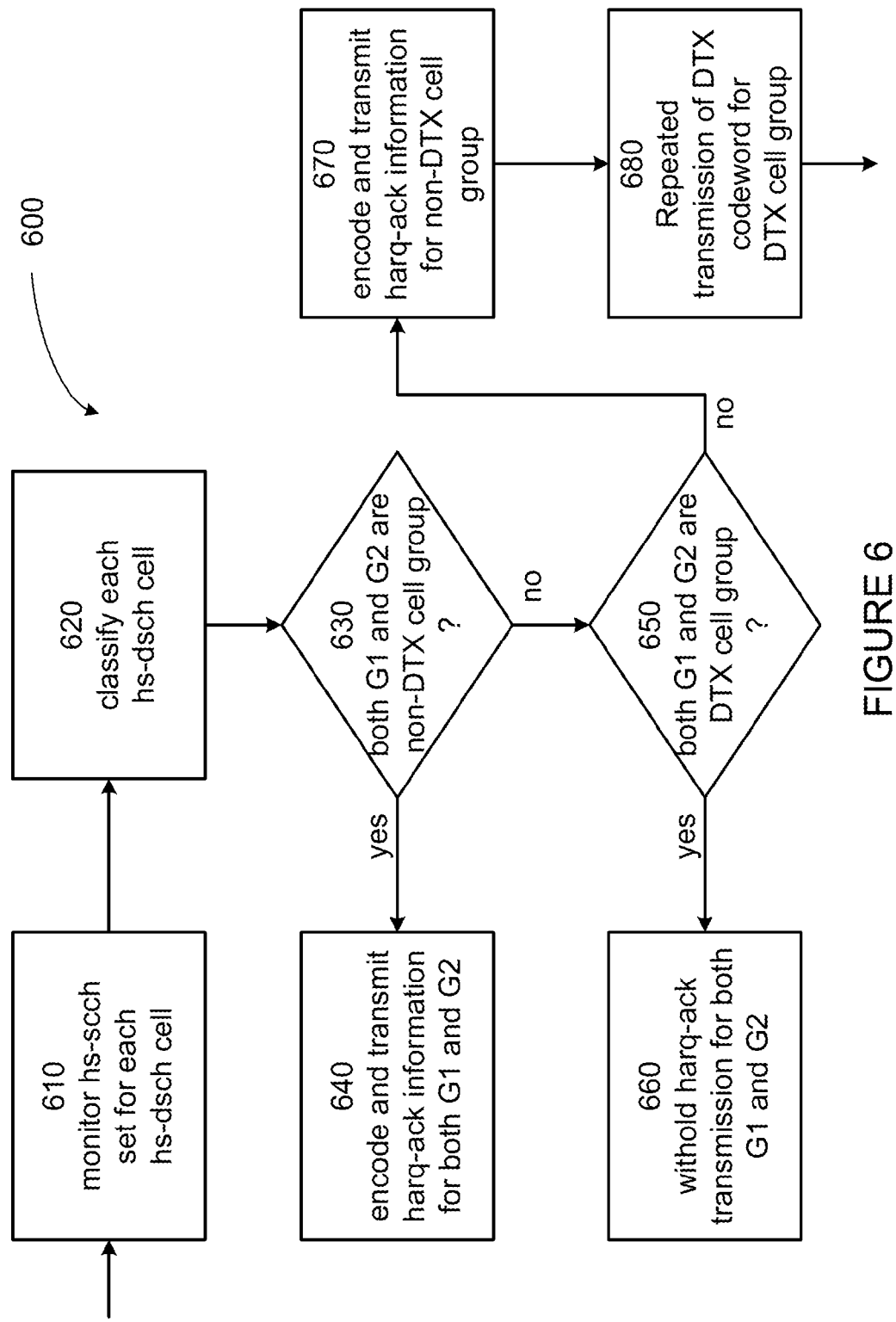
FIG. 6 is a flow chart illustrating a first non-limiting example embodiment for feedback signaling from a consumer node to a provider node.
Figure 10:
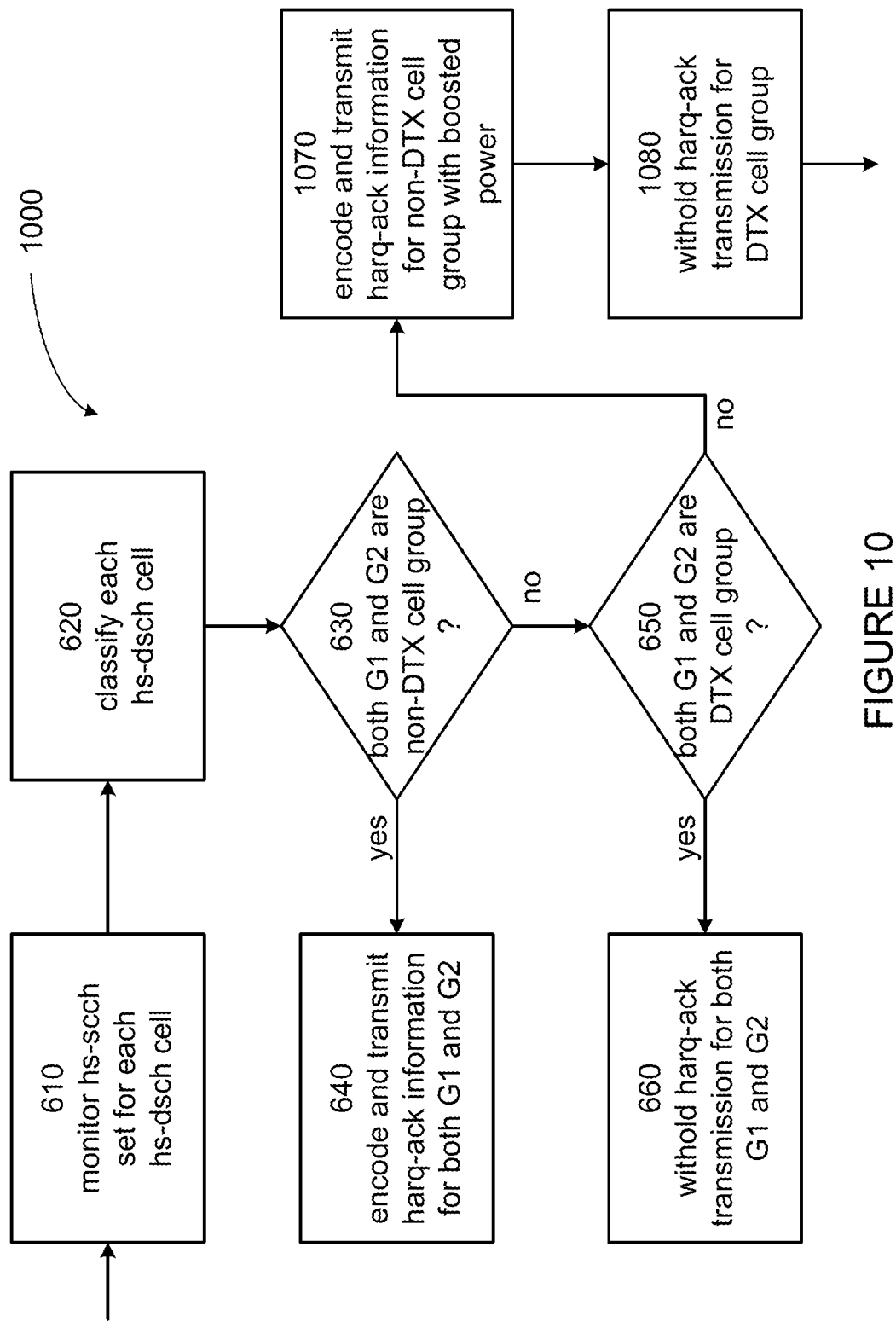
FIG. 10 is a flow chart illustrating a third non-limiting example embodiment to provide feedback from a consumer node to a provider node.

FIG. 10 is a flow chart illustrating a third non-limiting example embodiment to provide feedback from a consumer node to a provider node that also uses the example context used for FIG. 6. The steps S610-S650 are the same as described above. However, if both the G1 and G2 cell groups are not DTX groups, meaning there is a DTX cell group and a non-DTX cell group, the UE encodes and transmits HARQ-ACK feedback information for a non-DTX cell group with boosted power (S1070). A boosted transmit power level is greater than the transmit power that would be used by one of the HS-DPCCH channels if HARQ-ACK transmissions occurred on all HS-DPCCHs. On the other hand, the UE does not perform any transmission for the DTX cell group (S1080), which allows this "saved power" to be used for the non-DTX cell group power boost. Power boosting can ensure that the energy available for detection and decoding of HARQ-ACK transmissions is maintained even though only one of the I/Q branches is transmitted.

Figure 11:
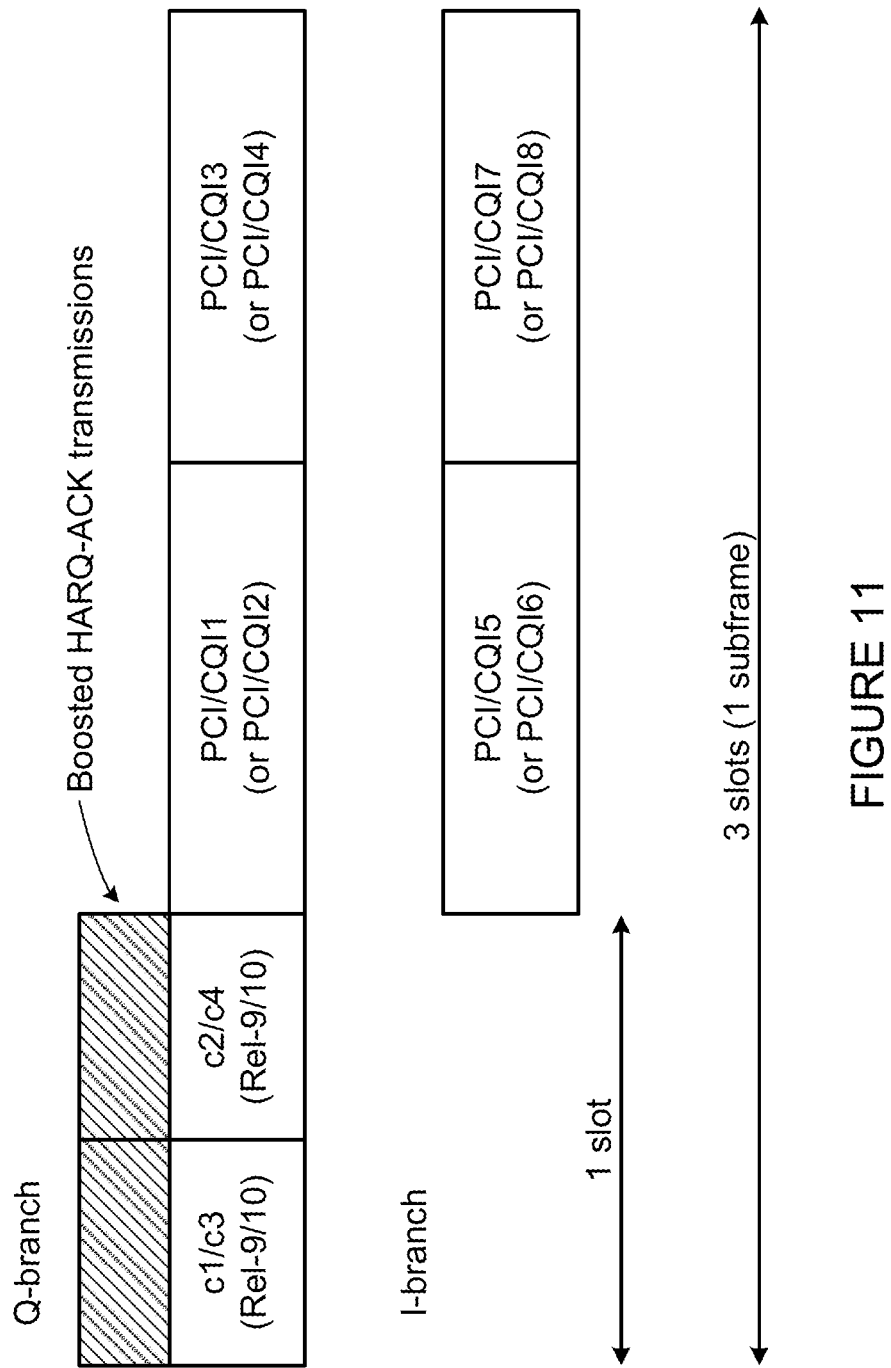
FIG. 11 illustrates an example HS-DPCCH subframe structure by the consumer node for the third embodiment.

FIG. 11 illustrates an example HS-DPCCH subframe structure by the consumer node for the third embodiment. Because the UE does not detect any HS-SCCH transmissions related to cells c5, c6, c7, and c8, the UE does not transmit any HARQ-ACK information on the I-branch. Instead, it boosts the transmit power for transmitting the HARQ-ACK information on the Q-branch.

Figure 12:
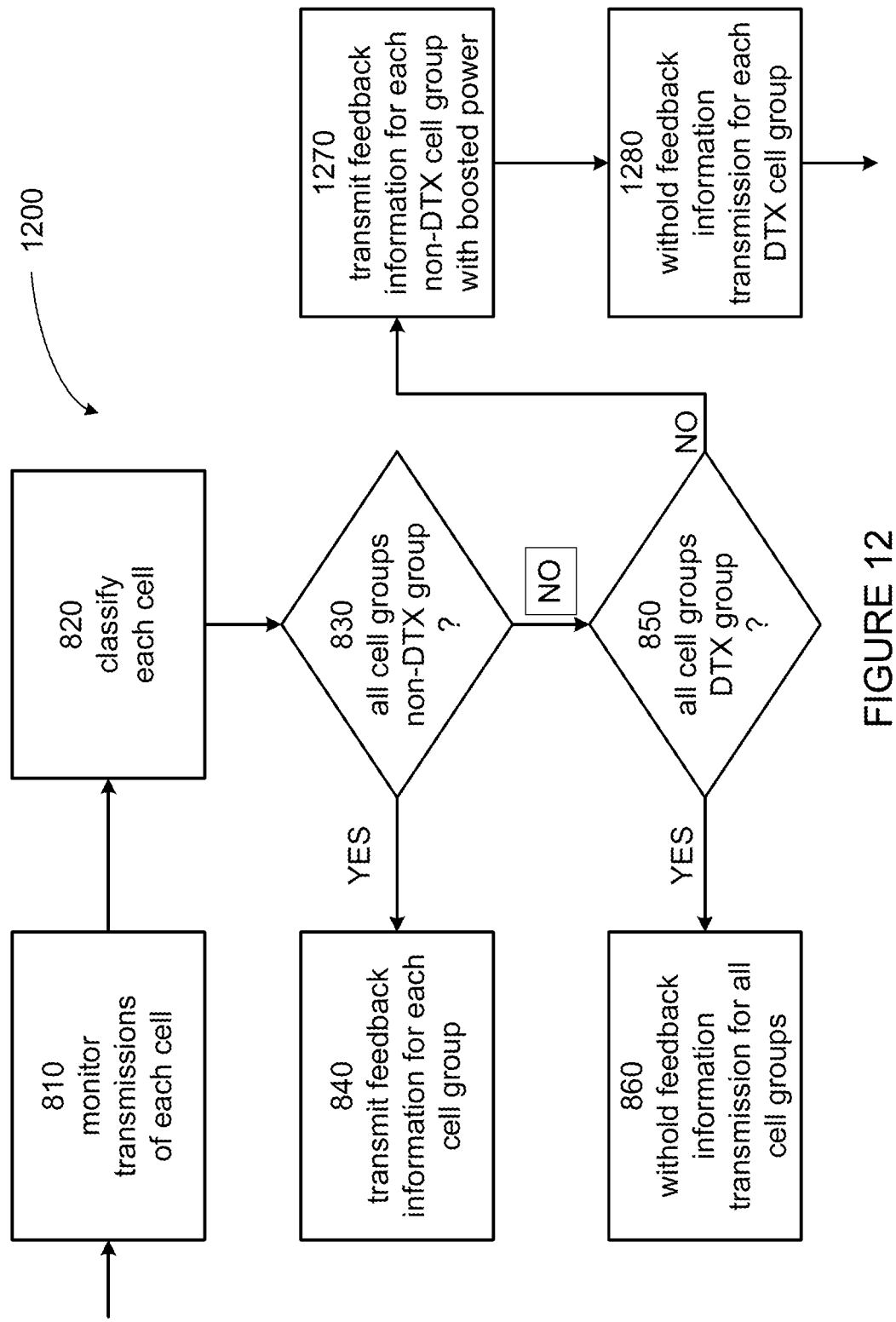
FIG. 12 is a flow chart illustrating a fourth non-limiting example embodiment to provide feedback from a consumer node to a provider node.

FIG. 12 is a flow chart illustrating a fourth non-limiting example embodiment to provide feedback from a consumer node to a provider node that is a more generalized version of the third embodiment. Steps S810-S860 are similar to those described above for FIG. 8. However, if all cell groups are not DTX groups, meaning there is at least one DTX cell group and at least one non-DTX cell group, the UE transmits HARQ-ACK feedback information for one or more of the non-DTX cell groups with boosted power (S1270). On the other hand, the UE does not perform any feedback transmission for each DTX cell group (S1280), which allows this "saved power" to be used for the non-DTX cell group power boost. Power boosting can ensure that the energy available for detection and decoding of HARQ-ACK transmissions is maintained even though only one of the I/Q branches is transmitted.

Figure 13:
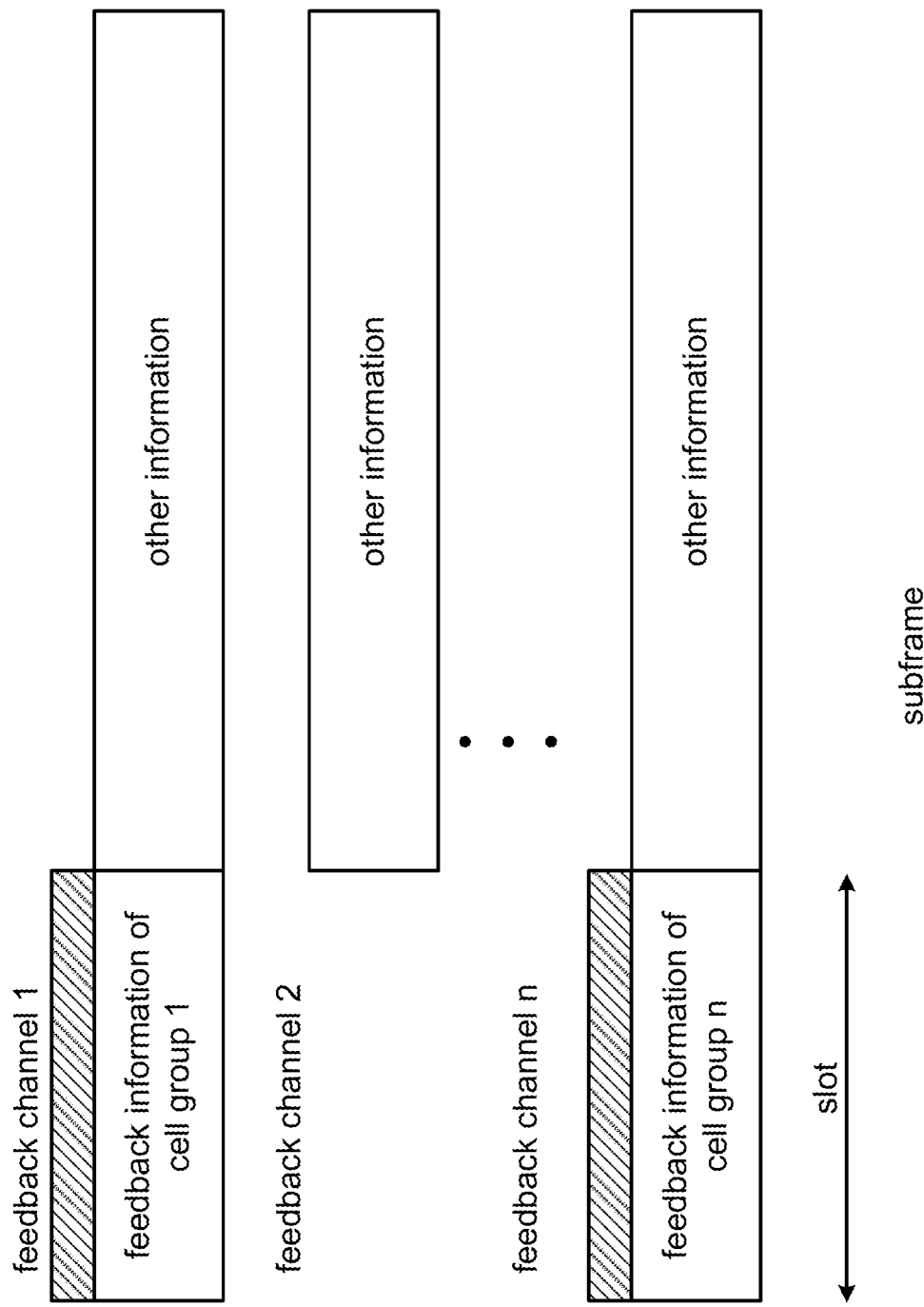
FIG. 13 illustrates an example consumer node feedback channel subframe structure for transmission from a consumer node to a provider node for the fourth embodiment.

FIG. 13 illustrates an example feedback channel subframe structure for transmission by the consumer node for the fourth embodiment. Each cell group has its associated feedback channel 1, 2, . . . , n. For feedback channels 1 and n in this example, the UE transmits the HARQ-ACK information for each non-DTX cell group with boosted transmit power, either the same or different amounts of boosted power. For feedback channel 2 in this example, the UE does not transmit for this associated DTX cell group as it would not for feedback channels for other DTX cell groups. This saved power is then used for the boosted signal energy for the non-DTX cell group feedback transmissions, which improves feedback signal detection and decoding at the provider node.

Figure 14:
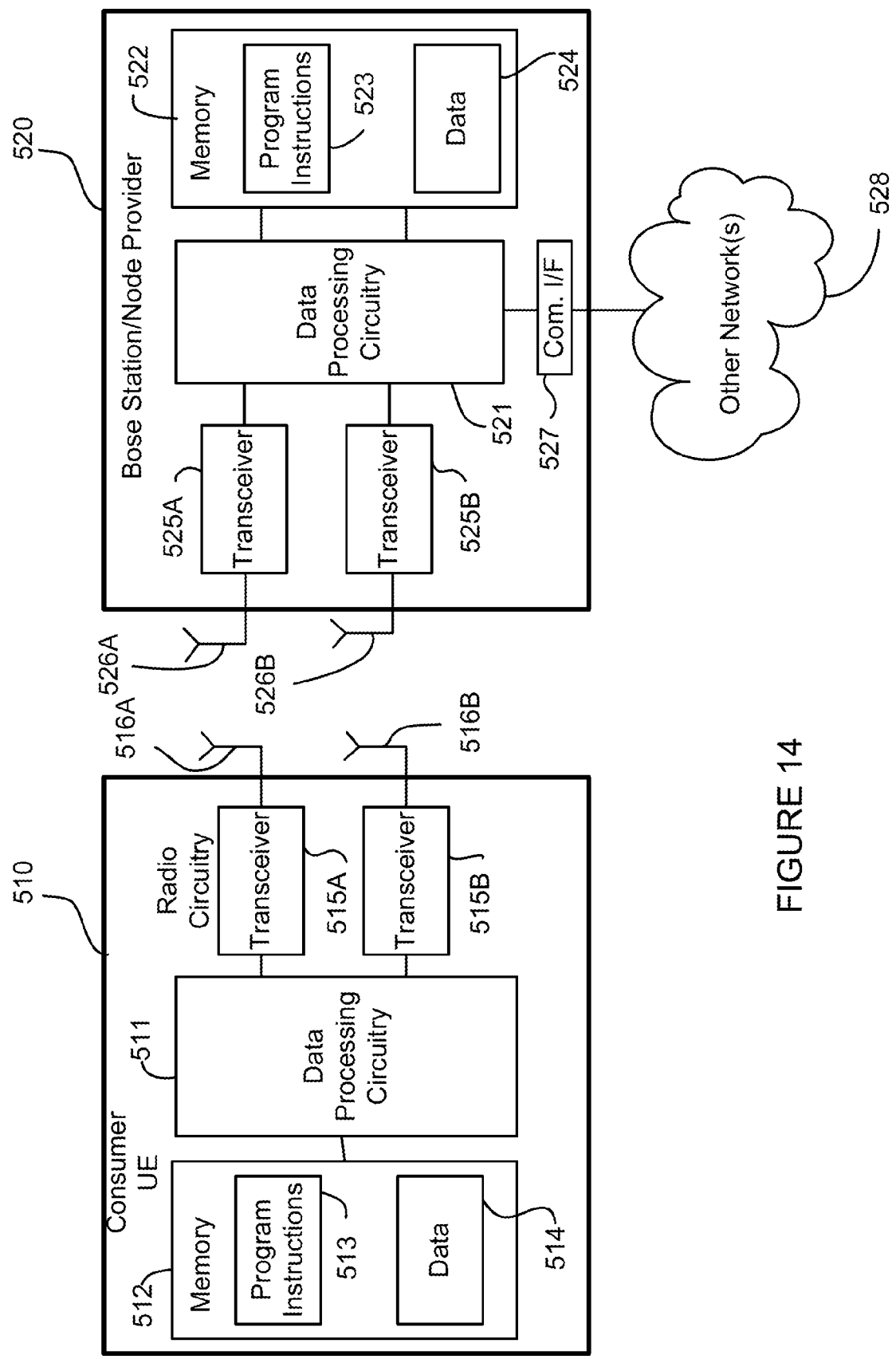
FIG. 14 illustrates non-limiting example function block diagrams for a UE and Node-B base station where both can function either as the consumer node or as the provider node.

FIG. 14 illustrates a wireless communications network including non-limiting example function block diagrams for a UE and Node-B base station where both can function either as the consumer node or as the provider node. The consumer UE 510 includes: data processing circuitry 511; a memory 512 coupled to the data processing circuitry 511; and radio circuitry including one or more RF transceivers having a transmitter and a receiver and baseband-to-RF and RF-to-baseband conversion circuitry coupled to the data processing circuitry 511. In this example, two transceivers are shown 515A and 515B each capable of bidirectional wireless communication and coupled to a respective antenna 516A and 516B. More than two antennas may be used at either or both of the UE and/or NodeB. However, it should also be appreciated that the technology described in this application may be used even if the UE and/or NodeB is equipped with only one antenna and/or none of the downlink carriers is configured in MIMO mode. The memory 512 stores program instructions 513 and data 514 for enabling the data processing circuitry 511 to perform the tasks described in this application.

The base station/Node-B provider 520 includes: data processing circuitry 521; a memory 522 coupled to the data processing circuitry 521; and radio circuitry including one or more RF transceivers having a transmitter and a receiver and baseband-to-RF and RF-to-baseband conversion circuitry coupled to the data processing circuitry 521. In this example, two transceivers are shown 525A and 525B each capable of bidirectional wireless communication and coupled to a respective antenna 526A and 526B. The memory 522 stores program instructions 523 and data 524 for enabling the data processing circuitry 521 to perform the tasks described in this application. The data processing circuitry 521 may be coupled via a communications interface 527 to one or more external networks or systems, such as the internet, for example.

The transceivers and antennas of the UE 510 and base station 520 may be utilized for MIMO communications. The memories 517 and 521 may be of any type suitable to the local technical environment and may be implemented using any suitable data storage technology, such as semiconductor-based memory devices, magnetic memory devices and systems, optical memory devices and systems, fixed memory, and removable memory, as non-limiting examples. The data processing circuitry 511 and 521 may be of any type suitable to the local technical environment, and may include one or more of general purpose computers, special purpose computers, microprocessors, digital signal processors (DSPs), and processors based on a multi-core processor architecture, as non-limiting examples. Embodiments may be implemented in one or across more than one processor, with the provider and consumer in a master-slave or distributed relation.

Although the description above contains many specificities, these should not be construed as limiting the scope of the disclosed subject matter but as merely providing illustrations of some of the presently preferred embodiments. Therefore, it will be appreciated that the scope of the disclosed subject matter fully encompasses other embodiments which may become obvious to those skilled in the art, and that the scope is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology for it to be encompassed hereby.

What is claimed is:

1. A method performed at mobile terminal of a wireless network, the method comprising:
   monitoring channel transmissions of a subframe from each of a plurality of activated serving cells serving the mobile terminal, the activated serving cells being grouped into first and second cell groups in which the first cell group includes a primary serving cell and one or more secondary serving cells and the second cell group includes one or more secondary serving cells different from the secondary serving cells of the first cell group;
   determining, for each activated serving cell based on the monitoring, whether information for the mobile terminal is detected in the subframe of the channel transmission from that activated serving cell;
   determining, for each of the first and second cell groups, whether that cell group is a discontinuous transmission (DTX) cell group or a non-DTX cell group, a DTX cell group being a cell group in which no information is detected in the subframe of the channel transmission from any activated serving cell in that cell group and a non-DTX cell group being a cell group in which information is detected in the subframe of the channel transmission from at least one activated serving cell in that cell group;
   transmitting, when one of the first and second cell groups is the DTX cell group and the other is the non-DTX cell group, first and second feedback information, respectively, on first and second feedback channels associated with the first and second cell groups to the primary serving cell, and
   wherein a DTX codeword is provided as the feedback information associated with the DTX cell group, the DTX codeword being a pattern of a predetermined number of bits indicating that no information for the mobile terminal was detected from any of the activated serving cells in the cell group.

2. The method of claim 1,
   wherein the first feedback information occupies a slot of a subframe of the first feedback channel and the second feedback information occupies a slot of a subframe of the second feedback channel,
   wherein the plurality of activated serving cells includes a primary serving High Speed-Downlink Shared Channel (HS-DSCH) cell mapped to one of the first and second feedback channels and one of the secondary serving HS-DSCH cells whose HARQ-ACK information is mapped to the other of the first and second feedback channels,
   wherein the channel transmissions are High Speed-Shared Control Channel (HS-SCCH) transmissions from the activated serving HS-DSCH cells,
   wherein the first cell group is a quadrature (Q)-branch cell group comprising the primary serving HS-DSCH cell and three secondary serving HS-DSCH cells, and the second cell group is an inphase (I)-branch cell group comprising a remaining one or more of the secondary serving HS-DSCH cells,
   wherein the step of determining whether information for the mobile terminal is detected comprises determining for each activated serving cell whether there is an HS-SCCH transmission detected that is directed to the mobile terminal from that activated serving cell,
   wherein the first and second feedback channels are Q and I-branches, respectively, of an I/Q multiplexed High-Speed Dedicated Physical Control Channel (HS-DPCCH),
   wherein the first feedback information and the second feedback information each include an HARQ-ACK codeword that indicates a transmission state for each activated serving cell of the corresponding cell group, and
   wherein the transmission state is one of an Acknowledgment (ACK) representing that transmission for the mobile terminal successfully decoded, a Negative Acknowledgment (NACK) representing that transmission for the mobile terminal is not successfully decoded, and a DTX representing that no transmission for the mobile terminal is detected.

3. The method of claim 2, wherein the first feedback information and the second feedback information each occupies 20-bits in a first slot of the subframe of the Q and I-branches of the I/Q multiplexed HS-DPCCH, respectively.

4. The method of claim 3, wherein the DTX codeword is a High Speed Packet Access (HSPA) release (Rel)-10 DTX codeword repeated twice.

5. The method of claim 3, wherein each of the first and second feedback information is a combination of two High Speed Packet Access (HSPA) release (Rel)-10 codewords.

6. The method of claim 2, wherein there is at least one activated serving cell in the DTX cell group and at least one activated serving cell in the non-DTX cell group.

7. A method performed at mobile terminal of a wireless network, the method comprising:
   monitoring channel transmissions of a subframe from each of a plurality of activated serving cells serving the mobile terminal, the activated serving cells being grouped into first and second cell groups in which the first cell group includes a primary serving cell and one or more secondary serving cells and the second cell group includes one or more secondary serving cells different from the secondary serving cells of the first cell group;
   determining, for each activated serving cell based on the monitoring, whether information for the mobile terminal is detected in the subframe of the channel transmission from that activated serving cell;
   determining, for each of the first and second cell groups, whether that cell group is a discontinuous transmission (DTX) cell group or a non-DTX cell group, a DTX cell group being a cell group in which no information is detected in the subframe of the channel transmission from any activated serving cell in that cell group and a non-DTX cell group being a cell group in which information is detected in the subframe of the channel transmission from at least one activated serving cell in that cell group;
   transmitting, when one of the first and second cell groups is the DTX cell group and the other is the non-DTX cell group, one of first and second feedback information on corresponding one of first and second feedback channels associated with the non-DTX cell group to the primary serving cell, and withholding transmission of the other of the first and second feedback information on the other of the first and second feedback channels associated with the DTX cell group, and
   wherein the feedback information transmitted on the one feedback channel is transmitted with a boosted transmit power level, the boosted transmit power being greater than the transmit power that would be used on one of the first and second feedback channels to transmit feedback information in a situation where the first feedback information and the second feedback information are transmitted on the first feedback channel and the second feedback channel, respectively.

8. The method of claim 7,
wherein the first and second feedback information each occupy a slot of a subframe of the first and second feedback channels,
wherein the first feedback information occupies a slot of a subframe of the first feedback channel and the second feedback information occupies a slot of a subframe of the second feedback channel,
wherein the plurality of activated serving cells includes a primary serving High Speed-Downlink Shared Channel (HS-DSCH) cell mapped to one of the first and second feedback channels and one of the secondary serving HS-DSCH cells whose HARQ-ACK information is mapped to the other of the first and second feedback channels,
wherein the channel transmissions are High Speed-Shared Control Channel (HS-SCCH) transmissions from the activated serving HS-DSCH cells,
wherein the first cell group is a quadrature (Q)-branch cell group comprising the primary serving HS-DSCH cell and three secondary serving HS-DSCH cells, and the second cell group is an inphase (I)-branch cell group comprising a remaining one or more of the secondary serving HS-DSCH cells,
wherein the step of determining whether information for the mobile terminal is detected comprises determining for each activated serving cell whether there is an HS-SCCH transmission detected that is directed to the mobile terminal from that activated serving cell,
wherein the first and second feedback channels are Q and I-branches, respectively, of an I/Q multiplexed High-Speed Dedicated Physical Control Channel (HS-DPCCH),
wherein the first feedback information and the second feedback information each include an HARQ-ACK codeword that indicates a transmission state for each activated serving cell of the corresponding cell group, and
wherein the transmission state is one of an Acknowledgment (ACK) representing that transmission for the mobile terminal successfully decoded, a Negative Acknowledgment (NACK) representing that transmission for the mobile terminal is not successfully decoded, and a DTX representing that no transmission for the mobile terminal is detected.

9. The method of claim 8, wherein the first feedback information and the second feedback information each occupies 20-bits in a first slot of the subframe of the Q and I-branches of the I/Q multiplexed HS-DPCCH, respectively.

10. The method of claim 9, wherein the DTX codeword is a High Speed Packet Access (HSPA) release (Rel)-10 DTX codeword repeated twice.

11. The method of claim 8, further comprising:
transmitting, when the first and second cell groups are both non-DTX cell groups, the first feedback information on the first feedback channels with a first regular transmit power level and the second feedback information on the second feedback channels with a second regular transmit power level,
wherein the boosted transmit power level is less than or equal to a sum of the first and second regular power levels.

12. The method of claim 7, further comprising a third cell group including one or more additional secondary serving cells, the third cell group being a non-DTX group and associated with a third feedback channel to the primary serving cell, and
transmitting third feedback information over the third feedback channel with a boosted power level.

13. A consumer node configured for communication in a wireless network, comprising:
radio circuitry configured to monitor channel transmissions of a subframe from each of a plurality of activated serving cells serving the mobile terminal, the activated serving cells being grouped into first and second cell groups in which the first cell group includes a primary serving cell and one or more secondary serving cells and the second cell group includes one or more secondary serving cells different from the secondary serving cells of the first cell group; and
data processing circuitry configured, for each activated serving cell based on the monitoring, to determine whether information for the mobile terminal is detected in the subframe of the channel transmission from that activated serving cell,
the data processing circuitry being further configured to determine, for each of the first and second cell groups, whether that cell group is a discontinuous transmission (DTX) cell group or a non-DTX cell group, a DTX cell group being a cell group in which no information is detected in the subframe of the channel transmission from any activated serving cell in that cell group and a non-DTX cell group being a cell group in which information is detected in the subframe of the channel transmission from at least one activated serving cell in that cell group,
the radio circuitry being configured to transmit, when one of the first and second cell groups is the DTX cell group and the other is the non-DTX cell group, first and second feedback information, respectively, on first and second feedback channels associated with the first and second cell groups to the primary serving cell, and
wherein the feedback information associated with the DTX cell group includes a DTX codeword, the DTX codeword being a pattern of a predetermined number of bits indicating that no information for the mobile terminal was detected from any of the activated serving cells in the cell group.

14. The consumer node of claim 13,
wherein the first feedback information occupies a slot of a subframe of the first feedback channel and the second feedback information occupies a slot of a subframe of the second feedback channel,
wherein the plurality of activated serving cells includes a primary serving High Speed-Downlink Shared Channel (HS-DSCH) cell mapped to one of the first and second feedback channels and one of the secondary serving HS-DSCH cells whose HARQ-ACK information is mapped to the other of the first and second feedback channels,
wherein the channel transmissions are High Speed-Shared Control Channel (HS-SCCH) transmissions from the activated serving HS-DSCH cells,
wherein the first cell group is a quadrature (Q)-branch cell group comprising the primary serving HS-DSCH cell and three secondary serving HS-DSCH cells, and the second cell group is an inphase (I)-branch cell group comprising a remaining one or more of the secondary serving HS-DSCH cells, wherein the data processing circuitry is configured to determine for each activated serving cell whether there is an HS-SCCH transmission detected that is directed to the mobile terminal from that activated serving cell, wherein the first and second feedback channels are Q and I-branches, respectively, of an I/Q multiplexed High-Speed Dedicated Physical Control Channel (HS-DPCCH), wherein the first feedback information and the second feedback information each include an HARQ-ACK codeword that indicates a transmission state for each activated serving cell of the corresponding cell group, and wherein the transmission state is one of an Acknowledgment (ACK) representing that transmission for the mobile terminal successfully decoded, a Negative Acknowledgment (NACK) representing that transmission for the mobile terminal is not successfully decoded, and a DTX representing that no transmission for the mobile terminal is detected.

15. The consumer node of claim 14, wherein the first feedback information and the second feedback information each occupies 20-bits in a first slot of the subframe of the Q and I-branches of the I/Q multiplexed HS-DPCCH, respectively.

16. The consumer node of claim 15, wherein the DTX codeword is a High Speed Packet Access (HSPA) release (Rel)-10 DTX codeword repeated twice.

17. The consumer node of claim 15, wherein each of the first and second feedback information is a combination of two High Speed Packet Access (HSPA) release (Rel)-10 codewords.

18. A consumer node configured for communication in a wireless network, comprising:
radio circuitry configured to monitor channel transmissions of a subframe from each of a plurality of activated serving cells serving the mobile terminal, the activated serving cells being grouped into first and second cell groups in which the first cell group includes a primary serving cell and one or more secondary serving cells and the second cell group includes one or more secondary serving cells different from the secondary serving cells of the first cell group; and data processing circuitry configured, for each activated serving cell based on the monitoring, to determine whether information for the mobile terminal is detected in the subframe of the channel transmission from that activated serving cell, the data processing circuitry being further configured to determine, for each of the first and second cell groups, whether that cell group is a discontinuous transmission (DTX) cell group or a non-DTX cell group, a DTX cell group being a cell group in which no information is detected in the subframe of the channel transmission from any activated serving cell in that cell group and a non-DTX cell group being a cell group in which information is detected in the subframe of the channel transmission from at least one activated serving cell in that cell group;

the radio circuitry being configured to transmit, when one of the first and second cell groups is the DTX cell group and the other is the non-DTX cell group, one of first and second feedback information on corresponding one of first and second feedback channels associated with the non-DTX cell group to the primary serving cell, and to withhold transmission of the other of the first and second feedback information on the other of the first and second feedback channels associated with the DTX cell group, and wherein the radio circuitry is configured to transmit the feedback information on the one feedback channel with a boosted transmit power level, the boosted transmit power being greater than the transmit power that would be used on one of the first and second feedback channels to transmit feedback information in a situation where the first feedback information and the second feedback information are transmitted on the first feedback channel and the second feedback channel, respectively.

19. The consumer node of claim 18, wherein the first feedback information occupies a slot of a subframe of the first feedback channel and the second feedback information occupies a slot of a subframe of the second feedback channel, wherein the plurality of activated serving cells includes a primary serving High Speed-Downlink Shared Channel (HS-DSCH) cell mapped to one of the first and second feedback channels and one of the secondary serving HS-DSCH cells whose HARQ-ACK information is mapped to the other of the first and second feedback channels, wherein the channel transmissions are High Speed-Shared Control Channel (HS-SCCH) transmissions from the activated serving HS-DSCH cells, wherein the first cell group is a quadrature (Q)-branch cell group comprising the primary serving HS-DSCH cell and three secondary serving HS-DSCH cells, and the second cell group is an inphase (I)-branch cell group comprising a remaining one or more of the secondary serving HS-DSCH cells, wherein the data processing circuitry is configured to determine for each activated serving cell whether there is an HS-SCCH transmission detected that is directed to the mobile terminal from that activated serving cell, wherein the first and second feedback channels are Q and I-branches, respectively, of an I/Q multiplexed High-Speed Dedicated Physical Control Channel (HS-DPCCH), wherein the first feedback information and the second feedback information each include an HARQ-ACK codeword that indicates a transmission state for each activated serving cell of the corresponding cell group, and wherein the transmission state is one of an Acknowledgment (ACK) representing that transmission for the mobile terminal successfully decoded, a Negative Acknowledgment (NACK) representing that transmission for the mobile terminal is not successfully decoded, and a DTX representing that no transmission for the mobile terminal is detected.

20. The consumer node of claim 19, wherein the first feedback information and the second feedback information each occupies 20-bits in a first slot of the subframe of the Q and I-branches of the I/Q multiplexed HS-DPCCH, respectively.

21. The consumer node of claim 20, wherein the DTX codeword is a High Speed Packet Access (HSPA) release (Rel)-10 DTX codeword repeated twice.

22. The consumer node of claim 18, wherein the radio circuitry is further configured to transmit, when the first and second cell groups are both non-DTX cell groups, the first feedback information on the first feedback channels with a first regular transmit power level and the second feedback information on the second feedback channels with a second regular transmit power level,
    wherein the boosted transmit power level is less than or equal to a sum of the first and second regular power levels.

23. The consumer node of claim 18, further associated with a third cell group including one or more additional secondary serving cells, the third cell group being a non-DTX group and associated with a third feedback channel to the primary serving cell, and
    wherein the radio circuitry is further configured to transmit third feedback information over the third feedback channel with a boosted power level.

24. A computer product comprising a non-transitory computer-readable medium storing computer instructions, which when executed by a computer, cause a computer in a mobile wireless communications terminal to perform the following steps:
    monitoring channel transmissions of a subframe from each of a plurality of activated serving cells serving the mobile terminal, the activated serving cells being grouped into first and second cell groups in which the first cell group includes a primary serving cell and one or more secondary serving cells and the second cell group includes one or more secondary serving cells different from the secondary serving cells of the first cell group;
    determining, for each activated serving cell based on the monitoring, whether information for the mobile terminal is detected in the subframe of the channel transmission from that activated serving cell;
    determining, for each of the first and second cell groups, whether that cell group is a discontinuous transmission (DTX) cell group or a non-DTX cell group, a DTX cell group being a cell group in which no information is detected in the subframe of the channel transmission from any activated serving cell in that cell group and a non-DTX cell group being a cell group in which information is detected in the subframe of the channel transmission from at least one activated serving cell in that cell group;
    transmitting, when one of the first and second cell groups is the DTX cell group and the other is the non-DTX cell group, first and second feedback information, respectively, on first and second feedback channels associated with the first and second cell groups to the primary serving cell, and
    wherein a DTX codeword is provided as the feedback information associated with the DTX cell group, the DTX codeword being a pattern of a predetermined number of bits indicating that no information for the mobile terminal was detected from any of the activated serving cells in the cell group.

25. A computer product comprising a non-transitory computer-readable medium storing computer instructions, which when executed by a computer, cause the computer in a mobile wireless communications terminal to perform the following steps:
    monitoring channel transmissions of a subframe from each of a plurality of activated serving cells serving the mobile terminal, the activated serving cells being grouped into first and second cell groups in which the first cell group includes a primary serving cell and one or more secondary serving cells and the second cell group includes one or more secondary serving cells different from the secondary serving cells of the first cell group;
    determining, for each activated serving cell based on the monitoring, whether information for the mobile terminal is detected in the subframe of the channel transmission from that activated serving cell;
    determining, for each of the first and second cell groups, whether that cell group is a discontinuous transmission (DTX) cell group or a non-DTX cell group, a DTX cell group being a cell group in which no information is detected in the subframe of the channel transmission from any activated serving cell in that cell group and a non-DTX cell group being a cell group in which information is detected in the subframe of the channel transmission from at least one activated serving cell in that cell group;
    transmitting, when one of the first and second cell groups is the DTX cell group and the other is the non-DTX cell group, one of first and second feedback information on corresponding one of first and second feedback channels associated with the non-DTX cell group to the primary serving cell, and withholding transmission of the other of the first and second feedback information on the other of the first and second feedback channels associated with the DTX cell group, and
    wherein the feedback information transmitted on the one feedback channel is transmitted with a boosted transmit power level, the boosted transmit power being greater than the transmit power that would be used on one of the first and second feedback channels to transmit feedback information in a situation where the first feedback information and the second feedback information are transmitted on the first feedback channel and the second feedback channel, respectively.

\* \* \* \* \*

UNITED STATES PATENT AND TRADEMARK OFFICE
CERTIFICATE OF CORRECTION

PATENT NO. : 9,197,369 B2
APPLICATION NO. : 13/335563
DATED : November 24, 2015
INVENTOR(S) : Bergman et al.

Page 1 of 1

It is certified that error appears in the above-identified patent and that said Letters Patent is hereby corrected as shown below:

In the specification

In Column 3, Line 33, delete "Rd-10." and insert -- Rel-10. --, therefor.

In Column 4, Line 47, delete "terminal" and insert -- terminal. --, therefor.

In Column 14, Line 1, delete "Rd-10." and insert -- Rel-10. --, therefor.

In Column 14, Line 2, delete "Rd-10" and insert -- Rel-10 --, therefor.

In Column 14, Line 3, delete "Rd-10" and insert -- Rel-10 --, therefor.

In Column 14, Line 8, delete "Rd-10" and insert -- Rel-10 --, therefor.

In Column 14, Line 44, delete "Rd-10" and insert -- Rel-10 --, therefor.

Signed and Sealed this
Twelfth Day of April, 2016

Michelle K. Lee
*Director of the United States Patent and Trademark Office*